United States Patent
Delfer et al.

(10) Patent No.: US 10,192,276 B1
(45) Date of Patent: Jan. 29, 2019

(54) MULTIPLE MAIL PIECE ASSEMBLY AND WRAPPING SYSTEM

(71) Applicant: Broadridge Output Solutions, Inc., Jersey City, NJ (US)

(72) Inventors: Frank Delfer, Incline Village, NV (US); Marc Fagan, Folsom, CA (US); Brett Flickner, Folsom, CA (US); Daniel Saldana, Carmichael, CA (US); Charles Preston, Orangevale, CA (US); Matthew Leettola, El Dorado Hills, CA (US); Chris Pettigrew, Rocklin, CA (US); Khi Lam, Rancho Cordova, CA (US); Christopher Codde, Shingle Springs, CA (US); Randy Franklin, Sacramento, CA (US); Paul Rudolph, Placerville, CA (US)

(73) Assignee: Broadridge Output Solutions, Inc., Jersey City, NJ (US)

( * ) Notice: Subject to any disclaimer, the term of this patent is extended or adjusted under 35 U.S.C. 154(b) by 210 days.

(21) Appl. No.: 13/754,013

(22) Filed: Jan. 30, 2013

Related U.S. Application Data

(60) Provisional application No. 61/632,766, filed on Jan. 30, 2012.

(51) Int. Cl.
*G06K 9/00* (2006.01)
*G06Q 50/26* (2012.01)
*G06Q 10/08* (2012.01)
*B07C 5/34* (2006.01)
*B07C 3/06* (2006.01)
*B07C 3/00* (2006.01)

(52) U.S. Cl.
CPC ............ *G06Q 50/26* (2013.01); *B07C 3/06* (2013.01); *B07C 5/3412* (2013.01); *G06Q 10/083* (2013.01); *B07C 3/00* (2013.01)

(58) Field of Classification Search
CPC .......... B07C 5/3412; B07C 3/00; B07C 3/02; B07C 3/06; B07C 3/08; G06Q 50/26; G06Q 10/083
USPC ................. 209/583, 584, 700; 700/223–227
See application file for complete search history.

(56) References Cited

U.S. PATENT DOCUMENTS

| | | | | |
|---|---|---|---|---|
| 5,186,336 A | * | 2/1993 | Pippin | .................. B07C 5/3412 198/367.2 |
| 5,901,855 A | * | 5/1999 | Uno et al. | ..................... 209/584 |
| 6,219,994 B1 | * | 4/2001 | Taniguchi | ....................... 53/147 |
| 7,259,345 B2 | * | 8/2007 | Kechel | ......................... 209/584 |

(Continued)

*Primary Examiner* — Joseph C Rodriguez
*Assistant Examiner* — Kalyanavenkateshware Kumar
(74) *Attorney, Agent, or Firm* — Greenberg Traurig, LLP

(57) ABSTRACT

A computer controlled mail piece assembly and wrapping system discloses a process for culling candidate mail pieces from bulk mail pieces, a mail piece feeder, a mail piece reader coupled to the feeder that identifies suitable candidate mail pieces, a collator coupled to the feeder for collating multiple identified mail pieces, a buffer coupled to the collator for regulating the delivery rate of the multiple mail pieces exiting to a wrap inserter, a wrap inserter coupled to the buffer for wrapping mail pieces and selected inserts into a mailing container, a printer interfaced with the wrap inserter for printing information onto the mailing container; an outstacker coupled to the wrap inserter for transferring envelope wrapped mail pieces and selected inserts to a desired location, and a computer with suitable programming for operating the system.

7 Claims, 36 Drawing Sheets

(56) References Cited

U.S. PATENT DOCUMENTS

| | | | |
|---|---|---|---|
| 7,405,375 B2* | 7/2008 | Hanson | 209/583 |
| 7,868,264 B2* | 1/2011 | Stemmle et al. | 209/584 |
| 2002/0023861 A1* | 2/2002 | Mileaf et al. | 209/542 |
| 2011/0046775 A1* | 2/2011 | Bailey et al. | 700/224 |

* cited by examiner

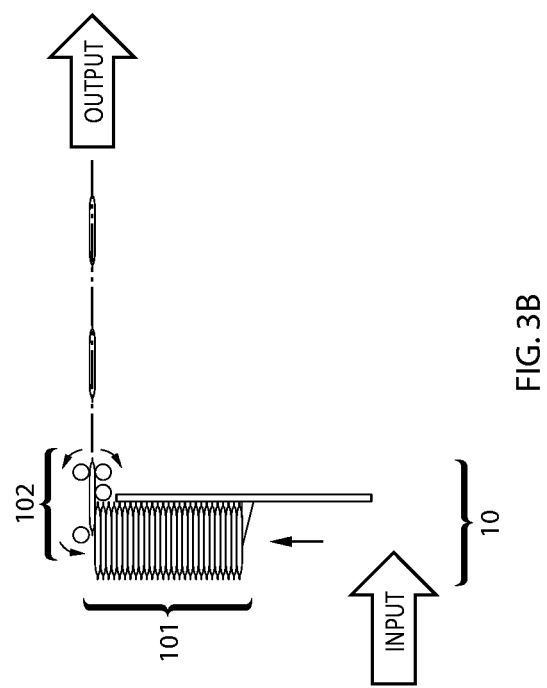

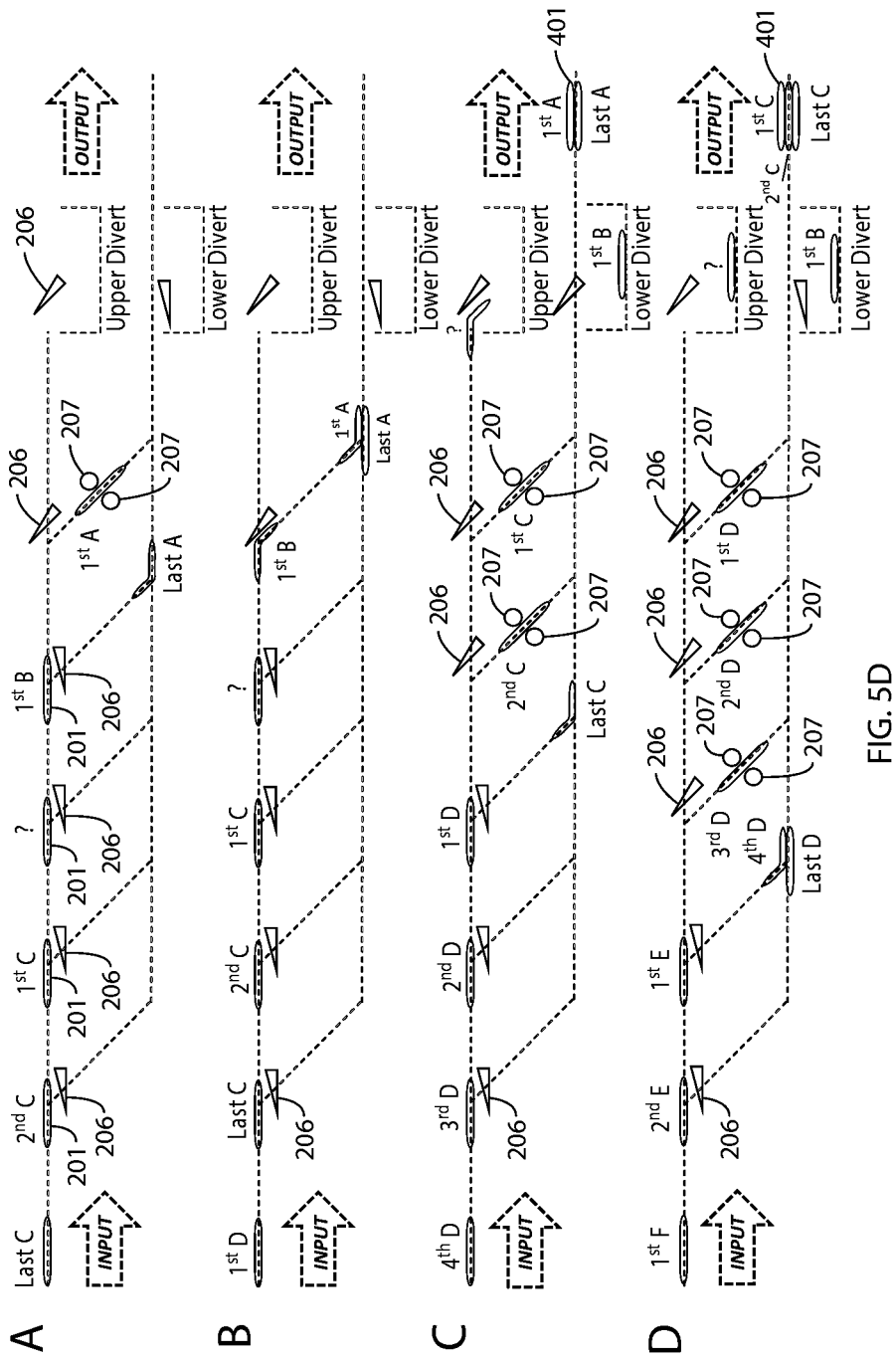

US 10,192,276 B1

MULTIPLE MAIL PIECE ASSEMBLY AND WRAPPING SYSTEM

CROSS-REFERENCE TO RELATED APPLICATIONS

This application is a nonprovisional of U.S. provisional patent application Ser. No. 61/632,766 filed on Jan. 30, 2012, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

The subject invention pertains generally to a system and method of operation for rapidly assembling into a single envelope wrapper multiple mail pieces that include letters/documents and selected inserts that are directed to a recipient.

2. Description of Related Art

Various mailing systems are utilized for mail items to recipients, however, no systems are currently available that rapidly assemble multiple mail piece letters/documents with selected inserts into one envelope that is addressed to a single recipient.

Further, for individuals and businesses processing a considerable quantity of mail, postal agencies, like the United States Postal Service (USPS), often have available various discount direct mailing rates. Taking advantage of these lower rates is often the difference between a profitable and a non-profitable enterprise. However, to benefit from these discount mailing rates several stiff hurdles exist. Hopefully, to maximize the efficiency of an operation and to lower costs, the postal agency attaches rigorous rules and regulations. Unless these rules are as highly automated and as rapid as the subject invention, they require a substantial loss of time in sending the mail out the door of the business and into the hands of the postal agency. Postal discount rate qualification rules present a gradient in benefits. For example, the USPS has "traying rules" which set the requirements for the type of mail that is placed in a standard mailing tray. Such considerations as grouping zip codes within a tray, sequencing zip codes, listing carrier routes, filling a mailing tray to its total thickness or height and weight limits, and the like all serve to build additional postal discounts. The subject computer directed system serves to maximize the postal discount by overseeing the mailing process within the framework of the postal rules and by grouping multiple mail pieces (including a plurality of letters/documents and desired inserts) into a single envelope wrapper that is addressed to a recipient.

U.S. Pat. No. 5,264,665 is an earlier system utilized by the subject Applicant to maximize mailing cost savings by automating the mailing system in general. For multiple letters/documents and selected inserts being mailed to the same recipient, the subject system is vastly more efficient than the previous approach in which multiple letters/documents and selected inserts were sent in more than one envelope.

BRIEF SUMMARY OF THE INVENTION

An object of the present invention is to provide a computer controlled system, apparatus, and method for placing within one mailing container multiple mail pieces all being sent to the same address.

Another object of the present invention is to furnish a computer controlled system, apparatus, and method for isolating a plurality of mail pieces all being sent to the same address and placing within one mailing container the multiple mail pieces to that address.

A further object of the present invention is to supply a computer controlled system, apparatus, and method for isolating a plurality of mail pieces all being sent to the same address and placing within one envelope/wrapper multiple mail pieces to that address.

Still another object of the present invention is to disclose a computer controlled system, apparatus, and method for isolating and sorting a plurality of candidate mail pieces from a general pool of mail pieces in which each group of candidate mail pieces is being sent to the same address and placing within one envelope/wrapper all like-addressed mail pieces.

Yet a further object of the present invention is to describe a computer controlled system, apparatus, and method for isolating and sorting a plurality of candidate mail pieces from a general pool of mail pieces, feeding and singulating each candidate mail piece into a reader for identification, collating each identified mail piece going to the same mailing address into a pack, and packaging into a mailing container the pack of mail pieces being sent to the same address.

Still yet another object of the present invention is to relate a computer controlled system, apparatus, and method for isolating and sorting a plurality of candidate mail pieces from a general pool of mail pieces, feeding and singulating each candidate mail piece into a reader for identification, collating each identified mail piece going to the same mailing address into a pack, buffering the transfer of like-addressed packs of mail pieces into a subsequent insertion and containerizing means that adds desired inserts to each pack and packages into a mailing container the pack of mail pieces and desired inserts being sent to the same address.

An additional object of the present invention is to relate a computer controlled system, apparatus, and method for isolating and sorting a plurality of candidate mail pieces from a general pool of mail pieces, feeding and singulating each candidate mail piece into a reader for identification, collating each identified mail piece going to the same mailing address into a pack, buffering the transfer of like-addressed packs of mail pieces into a subsequent insertion and wrapping means that adds desired inserts to each pack and wraps each pack and desired inserts in a mailing wrapper that has a printed address, and an outstacker that delivers the wrapped stack and desired inserts to a subsequent processing station for mailing.

Disclosed generally is a mail piece assembly and containerizing system for mailing in a single envelope/wrapper a plurality of mail pieces being mailed to the same recipient address. The subject invention comprises: means for culling mail for candidate mail pieces for the subject system; means for feeding candidate mail pieces into the system; means for reading identifying indicia on the candidate mail pieces coupled to the feeder, wherein the reading produces identified mail pieces; means for collating a plurality of identified mail pieces into mailing groups coupled to the reader, wherein each mailing group contains mail pieces going to the same recipient address; preferably means for buffering the flow rate of the mailing groups being transferred from the collator means to a subsequent containerizer/envelope/wrap inserter means; the containerizer/envelope/wrap inserter means preferably coupled to the buffer, wherein the containerizer/envelope/wrap inserter means selects desired inserts, if any, for each mailing group and containerizes in an envelope or wrapper each mailing group with desired inserts; preferably means for printing information on the envelope/wrapper may be included if an address windowed envelope is not utilized, wherein the preferred printing means is interfaced with the envelope/wrap inserter; preferably means for outstacking each envelope/wrapper packaged mailing group and desired inserts to a selected location, wherein the outstacking means is coupled to the containerizer/envelope/wrap inserter; and computer control means interfaced with the various system components for overseeing and controlling the operation of the system.

More specifically, the subject invention comprises a mail piece assembly and wrapping system for mailing in a single mailing container a plurality of mail pieces and selected inserts being mailed to a same recipient address. The subject system comprises: means for culling and sorting candidate mail pieces from a pool of general mail pieces; a feeder/singulator for delivering singulated candidate mail pieces to an indicia reader; the indicia reader coupled to the feeder/singulator, wherein identifying indicia on each candidate mail piece is read thereby producing identified mail pieces; a collator coupled to the reader for collating a plurality of the identified mail pieces going to the same recipient address into a mailing pack; a mailing pack buffer located between the collator and a wrap inserter for regulating a transfer speed of collated packs of identified mail pieces to an operational speed of the wrap inserter; the wrap inserter, wherein the wrap inserter comprises: means for packaging each mailing pack and desired inserts into an addressed mailing wrapper; and means for selecting the desired inserts for inclusion with each mailing pack into each addressed mailing wrapper; a printer for printing each addressed mailing wrapper couple to the wrap inserter; an outstacker for transferring the wrapped and addressed mailing pack and desired inserts to a selected location for further processing; and a computer controller with programming interfaced with the system for overseeing the operation of the system. Preferably, the computer controller comprises several interacting computers: a mailing computer; a collating computer; a buffering computer; a printing computer; and a finishing computer.

Further objects and aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWINGS

The invention will be more fully understood by reference to the following drawings which are for illustrative purposes only:

FIG. 3B shows an operational diagram of the subject feeder/singulator.

FIG. 5D shows an operational diagram of the subject collator with identified mail pieces being moved between paired belts and diverted to form individual mail packs, with each mail pack going to the same recipient address.

DETAILED DESCRIPTION OF THE INVENTION

Overview

Generally, the purpose of the subject invention "StatementPack™" system is to place multiple United States Postal Service (USPS) compliant mail pieces, all destined for the same U.S. mailbox, along with any desired inserts, into a single mailing container/envelope/wrapper, such that the resulting package is also fully USPS compliant and completely legal to mail by itself. The amount of postage required to mail the subject StatementPack™ is always less than the sum of the postage that would have been required to mail the internal mail pieces and desired inserts individually. The USPS's costs are lowered because they only have to process one mail piece instead of many. For the recipient, the same mail pieces end up in the same mailbox on the same day, except they have a StatementPack™ envelope wrapped around them. Again, in order for the subject StatementPack™ service/system to be commercially viable, the cost of the assembly process must be lower than the postage savings.

Theory of Operation

Figure 1:
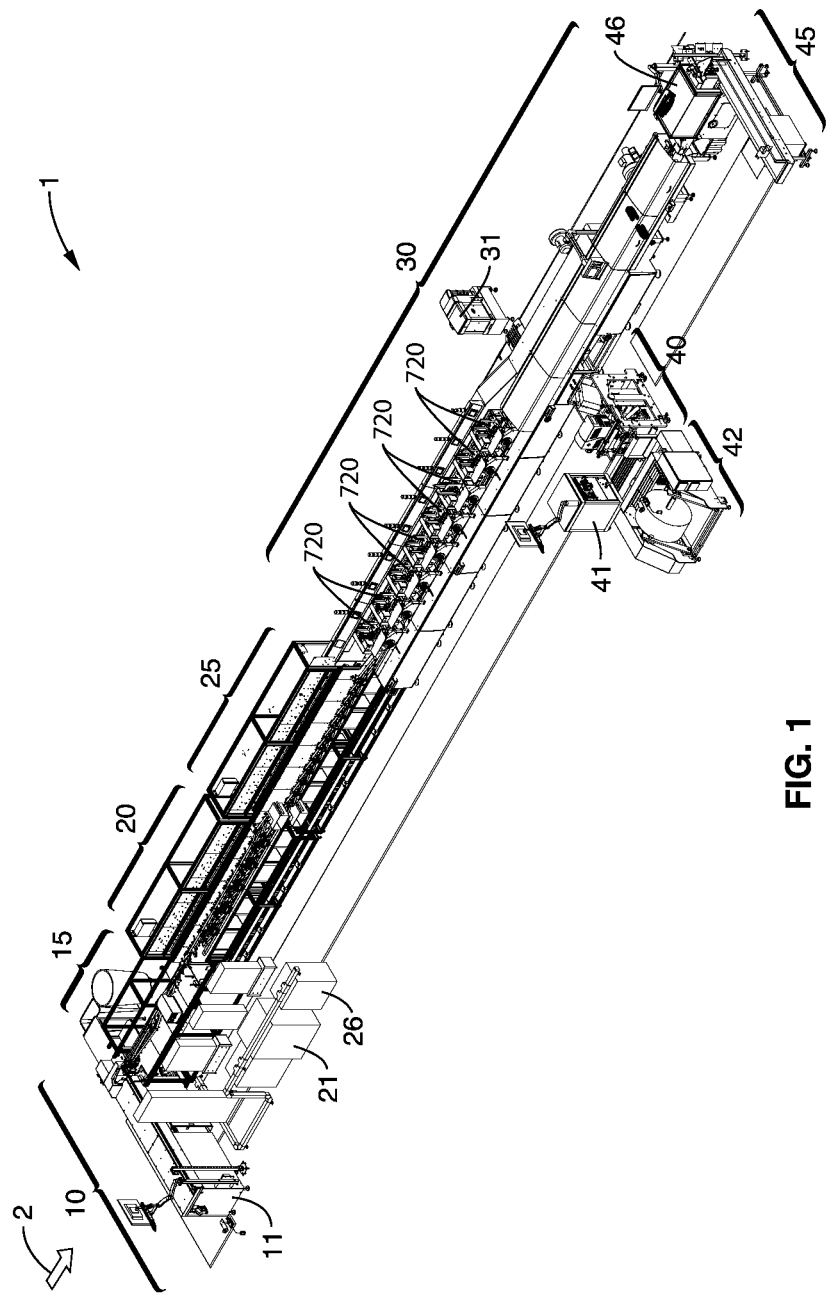
FIG. 1 shows the overall perspective scheme of the subject invention.

The system 1 generally depicted in FIG. 1, and more specifically in FIG. 2A through FIG. 15B, achieves the purpose of rapidly assembling and containerizing/packaging/enveloping/wrapping a plurality of mail items and desired inserts into one mail container/envelope/wrapper that is being mailed to a single address, by being highly automated and operating at high speed. "Candidate" mail pieces, culled and sorted either physically or electronically from a quantity of USPS compliant mail pieces by an upstream culling and sorting process 2, are loaded by an operator onto the feeder/singulator 10 at the upper left in FIG. 1. Preferably, the mail pieces then flow through the reader 15, collator 20, buffer 25, and containerizer/wrap inserter 30 sections of the machine, during which time they are grouped together and containerized/wrapped inside an envelopes that has the recipient's address either showing through a window or printed on the envelope or wrapper by the printer 40. Preferably, completed StatementPacks™ containing mail pieces and desired inserts are collected at the outstacker 45 and transferred by an operator to a downstream process for mailing.

Upstream Culling Process

Figure 2A:
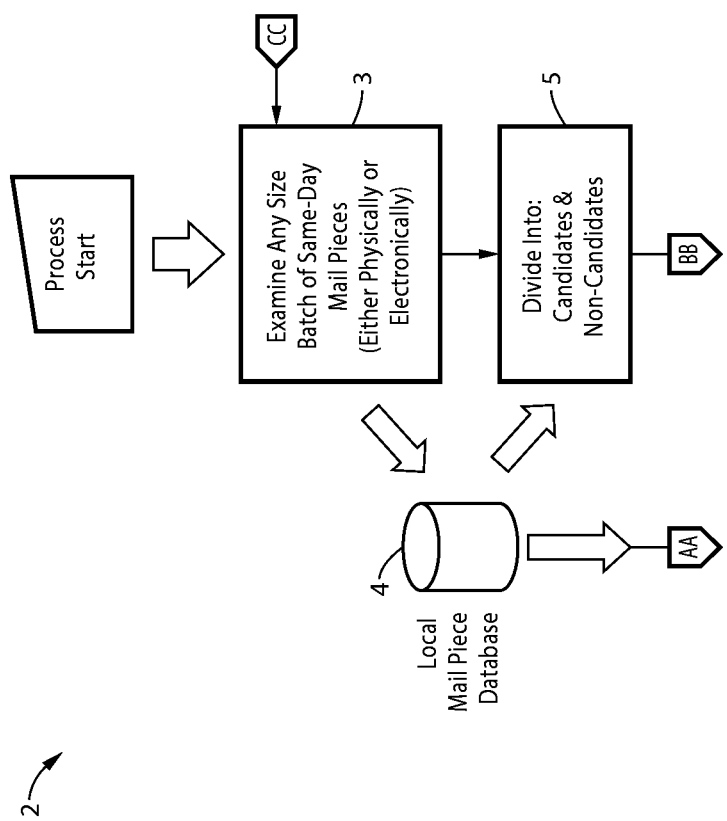
FIG. 2A is the first/top portion of a flow diagram showing the initial culling/sorting process that separates and sorts a general population of mail pieces into candidate and non-candidate mail pieces with the candidate mail pieces being forwarded to a feeder/singulator of the subject invention.
Figure 2B:
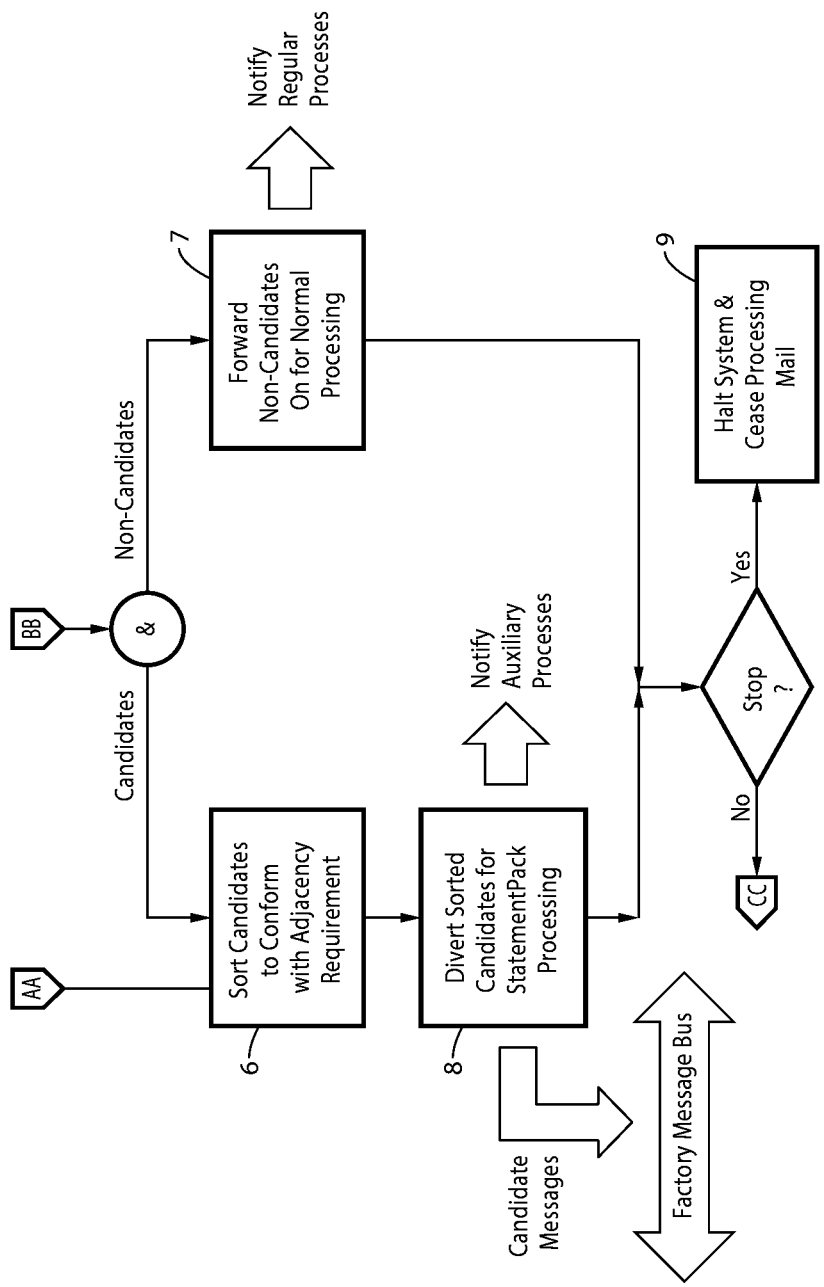
FIG. 2B is the second/lower portion of the flow diagram described for FIG. 2A immediately above.
Figure 3A:
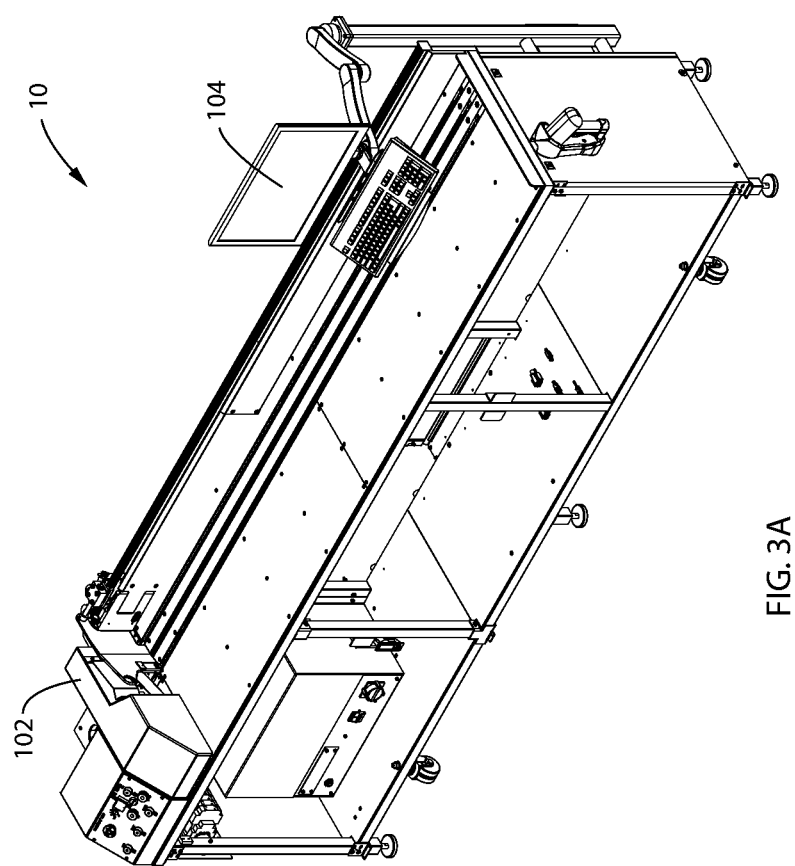
FIG. 3A shows a perspective view of the feeder/singulator utilized with the subject invention.

FIG. 1 notes the culling and sorting process 2 that comes before the feeder/singulator 10 in the subject invention (FIGS. 2A and 2B show the programming details for the culling and sorting process and are discussed below). All "candidate" mail pieces destined for the same StatementPack™ must be adjacent to each other, so that they exit the feeder 10 one after another, with no other StatementPack™ candidates in between. Primary responsibility for meeting this constraint belongs to an upstream culling process. This culling process 2 may be accomplished either manually or electronically. The electronic culling method is currently being utilized with the subject invention. A mail identification process records exactly what mail will be contained within any future mailing tray and is employed to identify mail pieces/documents in a job, prior to their actual printing and mailing, that meet the necessary qualifications to be designated as StatementPack™ candidates. These documents meet certain customer-agreed criteria such as the same destination address and recipient last name. Other criteria are possible and considered within the realm of this disclosure, but the documents must include the same destination address. At this point, the notification messages are transmitted, providing the StatementPack™ machine with the information it will need to process the documents when they arrive at a future time.

Once the document candidates are identified all the documents in the job are then electronically sorted and assigned to containers such that when the job is produced the candidates are separated from the rest of the mail and collected into their own container(s) such that they meet the adjacency criteria. These special containers are then routed to the subject StatementPack™ system/machine.

The manual means by which document candidates are culled may also be utilized with the subject system. The culled candidates are sorted into their own containers and a printed version of the work order messages is provided so that operators can assemble the StatementPacks™ by hand. Currently, the electronic culling process is preferred.

In a production version of the manual culling process, an electronic pre-notification is received in the associated controller for all documents directed toward the subject system and the process pre-identifies those documents meeting the necessary criteria and reserves space to collect them when they arrive. This space is called the StatementPack™ Candidate Bin. When candidate documents flow into a letter sorter, a sorter control tests one further criterion, which is: can the candidates be placed into the Candidate Bin in perfect succession, so that they meet the adjacency criteria? If so, that is what happens and if not, perhaps because two potential candidates are widely separated from each other with many other candidates, destined for different recipient addresses, in between, then those candidates are rejected and go to their original destination bins for delivery by ordinary means.

Candidates collected successfully into StatementPack™ Candidate Bins cause a message to be generated providing the subject StatementPack™ system/machine with the information it will need to process the documents when they arrive at a future time. The documents are then collected carefully, so that the adjacency criteria remain intact, into special containers, which are then routed to the subject StatementPack™ system/machine.

FIGS. 2A and 2B illustrate a flow diagram of the culling and sorting process 2 of the subject invention (FIG. 2A is the upper half of the flow diagram and FIG. 2B is the lower half of the flow diagram). Any size batch of same-day mail pieces are examined, either physically or electronically 3. This examination process 3 is associated with a local mail piece database 4. The examination results in the same-day mail pieces being divided into "candidate" and "non-candidate" mail pieces 5. The candidate mail pieces are sorted to conform to adjacency requirement 6 according to the information stored in the local mail piece database 4. The non-candidate mail pieces are forwarded to a normal processing route 7 that is notified that these non-candidates will be coming into the normal processing pathway. The sorted candidate mail pieces are diverted 8 for StatementPack™ processing. The associated computer controllers (further discussed below) and any other auxiliary processes are notified that the culling and sorting process 2 has occurred. The culling and sorting process 2 continues to run until complete and the process is halted 9.

Feeder/Singulator

The feeder/singulator 10 (shown in detail in FIGS. 3A and 3B) and an associated computer 11 (see FIG. 1) is typical of those used for folded mail sortation (i.e. it is designed to handle mail of various sizes and thicknesses), provided they fall within USPS constraints for folded mail. The operator O loads mail pieces onto the deck of the feeder 10 in a manner not unlike ordinary mail sortation, in this case adding new mail at the right end of the feeder hopper, with the right side of the hopper contents being held upright by a movable fence. The operator O orients the mail pieces such that the send addresses are upright and facing toward the operator's O right. This ensures the addresses will be presented properly to the camera in the downstream reader section 15. The feeder 10 picks individual mail pieces from the left end of the hopper. The deck of the feeder 10 moves the hopper contents gradually from right to left, toward the picking station, so that singulated mail pieces always exit the feeder 10 from the same position. The feeder 10 sends mail pieces toward the reader section 15 at a typical speed of 150 inches per second and a typical rate approaching 40,000 pieces per hour.

A unique constraint solely relevant to StatementPack™ production is the rule of adjacency (see culling and sorting process 2 described above). Again, all candidate mail pieces destined for the same StatementPack™ must be adjacent to each other, so that they exit the feeder/singulator 10 one after another, with no other StatementPack™ candidates in between. Primary responsibility for meeting this constraint belongs to the upstream culling process (again, described above) and the feeder/singulator operator is additionally responsible for maintaining adjacency conformance while loading the hopper. The Mailing Computer will detect and divert adjacency rule violations so that the operator can either correct them and return them to the feeder 10, or simply release them into the regular mail stream without trying to make a StatementPack™ out of them.

As long as StatementPack™ candidates are adjacent to each other, it doesn't matter what order they are in, nor does it matter what order the StatementPack™ candidate groups are in. The Mailing Computer will calculate the most economically expedient manner in which to assemble candidates and automatically configure the machine without requiring any input from the operator.

An operational flow diagram for the subject feeder/singulator 10 is shown in FIG. 3B. During normal operation of the subject system, the operator O is positioned next to the feeder 10. The operator O loads upstream-culled candidate mail pieces 101 onto the feeder 10 at the input location. The computer controlled/interfaced rollers 102 then feed from the feeder/singulator base, via the gripping rollers 102, the candidate mail pieces 101, one-at-a-time (singulated), to the output which leads directly to the subsequent computer-controlled/interfaced reader 15. The operator O may follow the process on the associated computer interface station 104.

Reader

Figure 4A:
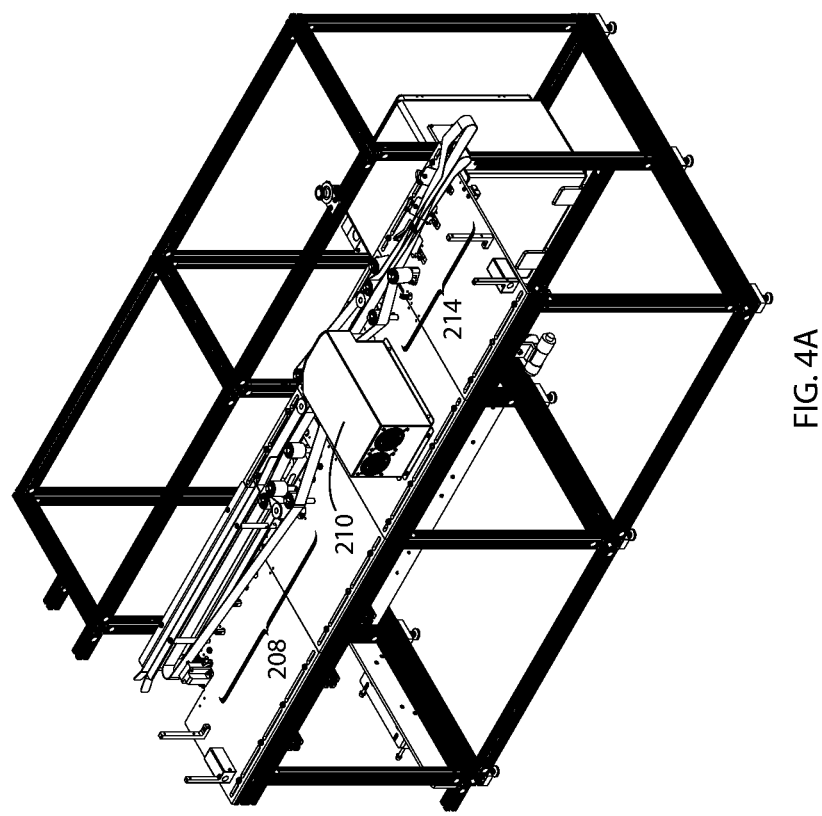
FIG. 4A shows a perspective view of the reader employed with the subject invention.
Figure 4B:
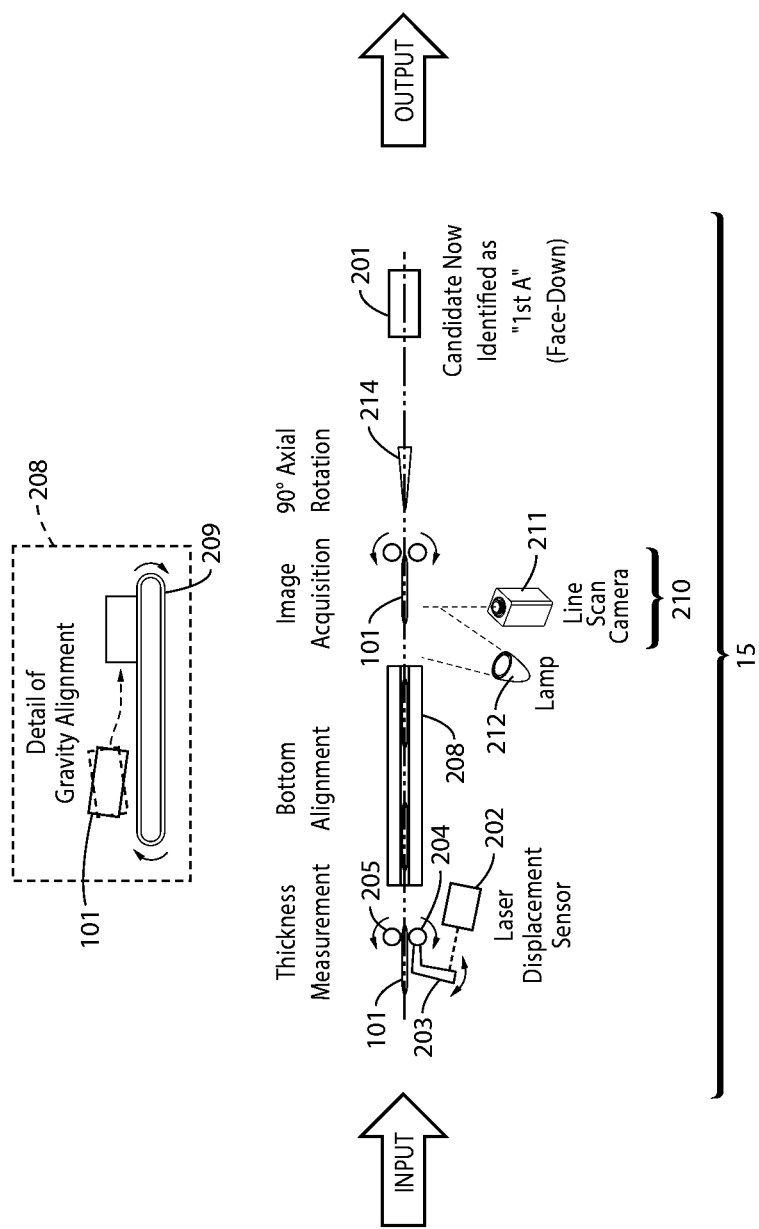
FIG. 4B shows an operational diagram of the subject reader.

The subject reader 15 is shown in FIGS. 4A and 4B. The thickness of each candidate mail piece 101 exiting the feeder/singulator 10 is measured by a combination mechanical and laser displacement system 202, 203, 204, and 205. It is stressed that other equivalent means may be utilized for the thickness measurement process. The Collating Computer (please note, all of associated computers are discussed in detail below) captures thickness readings approximately every 1½ millimeters of travel, and the gauge is sensitive enough to discern differences smaller than a single sheet of paper. The Collating Computer is used for this task because, unlike the Mailing Computer, it uses a time-deterministic operating system, which is better suited to this type of task.

These readings give the Collating Computer the ability to virtually draw a graph of the package's thickness profile allowing, for example, any mechanical oscillations to be filtered out mathematically, or for the zero-thickness position to be reset automatically as the pinch rollers 204 and 205 wear, increasing the accuracy and reliability of the final assessment of the candidate mail piece's 101 thickness, which is then provided to the Mailing Computer for use in calculating Collating Plans. The Collating Computer is powerful enough to provide the candidate mail piece's 101 thickness to the Mailing Computer by the time its Intelligent Mail Barcode is decoded.

The length and shape of the thickness profile of each candidate mail piece 101 further enables the Collating Computer to verify that two documents didn't "shingle" exiting the feeder/singulator 10, since that curve would have a bump in the middle where the two letters overlapped.

Finally, the high degree of accuracy of the thickness measurement enables the Mailing Computer, once the identity of the candidate is acquired (just two feet or so further downstream) to verify that no additional candidate(s) stuck accidentally to the back of the first candidate, i.e. went through as a "double".

Candidate mail pieces 101 exiting the feeder/singulator 10 next enter the reader's gravity aligner 208. The conveyor belt 209 keeps the candidate mail piece 101 traveling at about 150 inches per second but allows gravity to align its bottom edge with the conveyor belt 209 underneath. Proper alignment is critical to downstream processes.

Using a machine vision system 210, preferably comprised of a camera 211 and illuminating lamp 212, the reader section 15 then scans the send address on each candidate mail piece 101 for its identifying indicia which is preferably the Intelligent Mail Barcode (IMB) symbol or its equivalent, now known or later developed. The (required) IMB indicia contain a serial number that uniquely identifies each candidate mail piece 101. Since the upstream culling process notifies the Mailing Computer beforehand about all candidate mail pieces, the Mailing Computer can use the serial number to quickly identify all relevant information about the mail piece: its weight, destination, mailer identity, recipient name, potential fellow StatementPack™ candidates, and expected thickness. This expected thickness is compared to the just-measured thickness to verify package integrity.

Using this information, in combination with information about neighboring mail pieces, and applying various business rules and USPS regulations, the Mailing Computer calculates how the mail piece should be processed by the Collation section downstream and is now an "identified" mail piece 201.

When the scan is complete the reader 15 section rotates 214 the mail piece 201, still travelling at about 150 inches per second, so that its send address is facing down. The mail piece is then fed into the collator section 20, where the collation process begins. For example, the typical amount of time between completion of the scan and commencement of collation is approximately 15 hundredths of a second. Within that space of time, the nearly 20 megabit image of the mail piece's face must be transferred from the camera 211 to the Mailing Computer, the IMB symbol identified and decoded, the relevant information looked up, and the collation plan calculated.

The collation plan takes into account the facts about the candidates available for assembly, the weight (max. 3.5 oz.) and thickness (max. ¼ inch) of the materials to be used in creating the StatementPack™, USPS rules and regulations, and finally, the physical constraints of the collator 20.

By way of example, say the Mailing Computer is notified by the culling process of two candidates, J and K, that have been sent for StatementPack™ processing because both are destined for the same mailbox (same address) on the same day. When mail piece J is identified by the Mailing Computer, it is recognized as the first of what should be two; the Mailing Computer then verifies that combining the two into a single StatementPack™, with associated inserts or other such contents, will not violate USPS rules and regulations. Assuming all is well, it then instructs the collator 20 to process candidate J as "first". Assuming candidate K is identified next, it instructs the collator 20 to process candidate K as "second (and last)". These "first" and "second (and last)" instructions make up the Collation Plan for the StatementPack™ containing mail pieces J and K.

By way of further example, say the Mailing Computer is notified by the culling process of seven candidates, L, M, N, O, P, Q, and R, that have been sent for StatementPack™ processing because they are all destined for the same mailbox on the same day. Say candidate M is identified first, immediately following candidate K, above. If the collator 20 is physically constrained to a maximum of 5 candidates per StatementPack™, the Mailing Computer will expect to make at least two Packs, and send M into the collator 20 as "first," under the assumption that L is probably missing. Say N and O are next identified and, passing weight and thickness tests, are sent into the collator 20 as "second" and "third." Say P is next identified but is too thick or too heavy to fit into the same StatementPack™ as M, N, and O. The collator 20 will then be instructed to process previously-delivered candidate O as "last" and next-to-arrive candidate P as "first" in the next StatementPack™. Say candidates Q and R come next and, passing weight and thickness checks, are sent to the collator 20 as "second" and "third." If the next candidate identified is L, and it passes weight and thickness checks, it can be sent to the collator 20 as "fourth (and last)". If, instead of L, candidate S were identified, the collator 20 could have been instructed to treat candidate R as "last", and candidate S as "first" of the next StatementPack™ Together these groups of instructions make up each StatementPack's™ Collation Plan.

An exemplary operational flow diagram for the subject reader 15 is shown in FIG. 4B. Input singulated candidate mail pieces 101 are measured for thickness by a suitable means (in the FIG. 4B example: 202, 203, 204, and 205). It is stressed that the thickness determination means is a usually a mechanical, electromechanical, or light sensor device. Preferably, the thickness determination means is a laser displacement sensor apparatus 202 in which the thickness of a candidate mail piece 101 is established by computer-associated analysis of the movement of a laser beam reflected off a reflective surface 203 that is mounted to a jaw-attached arm 204 that pivots as a candidate mail piece 101 passes through opposable mechanical jaws 204 and 205. Following the thickness determination step, candidate mail pieces 101 move onto a gravity alignment belt 208 that vibrates the candidate mail pieces 101 to align the bottom edges before they pass into the indicia scanner 209. The indicia scanner 209 usually comprises an image acquisition means of a suitable type, depending upon the exact type of indicia being read. Preferably, the image acquisition means 210 is a line scan camera 211 and illuminating lamp 212 that, in association with specific computer programming, reads the indicia from the candidate mail pieces 101 and identifies each mail piece as to exactly which mailing address/name it belongs and into which position it will be placed in the final assembled mailing group. Each identified mail piece 201 is rotated 90° (face-down) 214 and passed to the output of the reader 15.

Collator

The collator 20 is made up of two or more modules 205 of the subject type pictured in FIGS. 5A, 5B, 5C, and 5D. A computer 21 is associated with the collator 20 (see FIG. 1). A collator 20 with N modules can make StatementPacks™ with up to N letters inside.

Figure 5A:
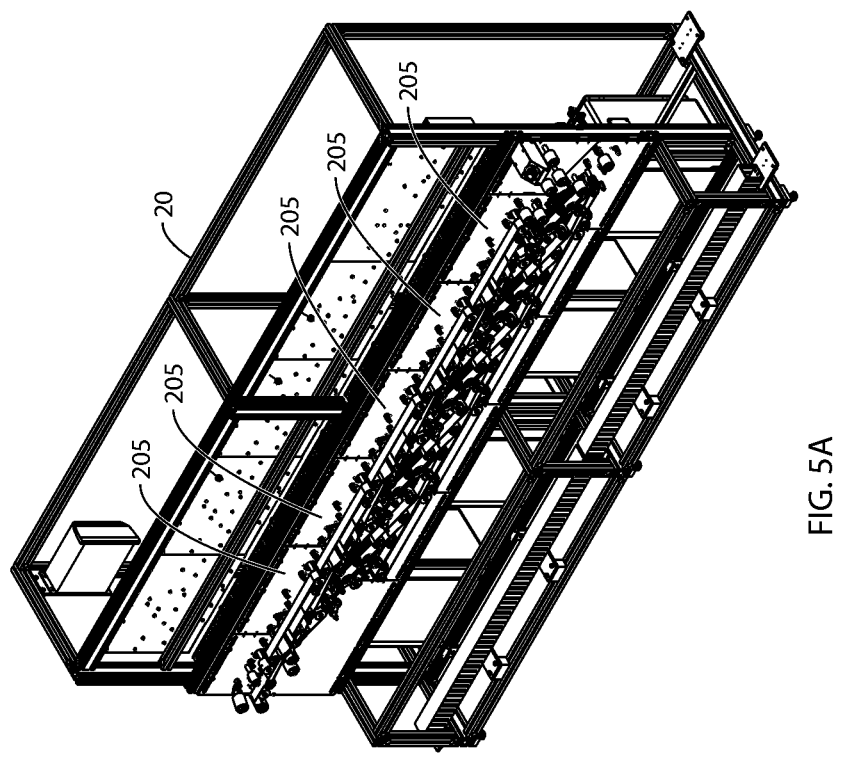
FIG. 5A shows a perspective view of the collator used with the subject invention in which paired transferring belts are mounted in a plurality of linkable units or modules to form the utilized collator.
Figure 5B:
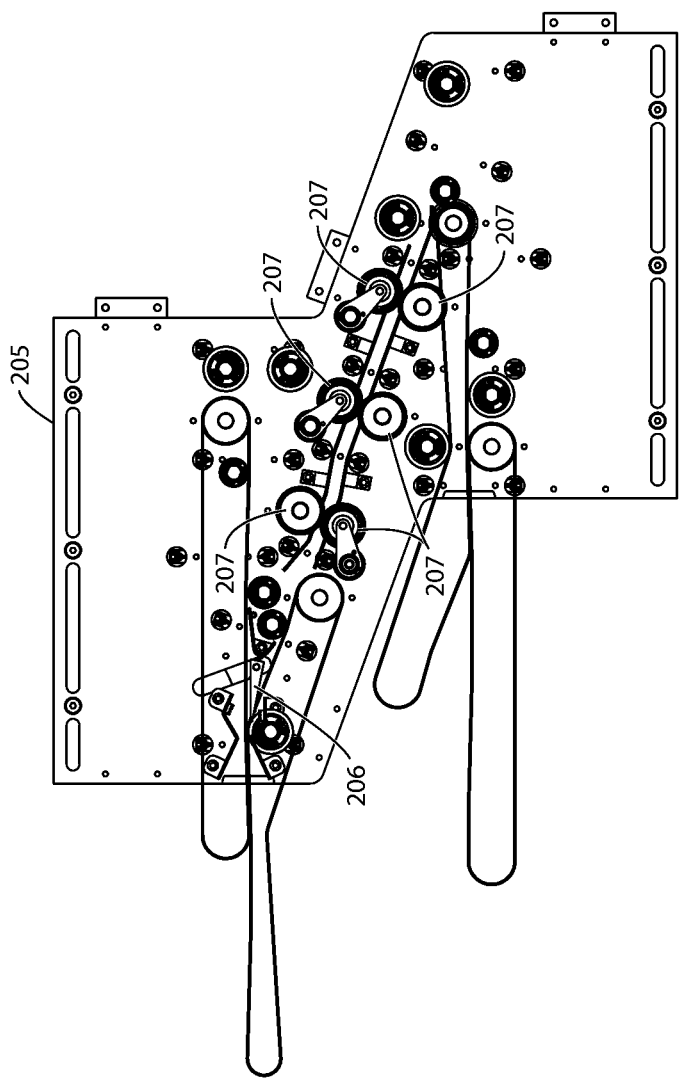
FIG. 5B shows a front view of a single collator unit/module.
Figure 5C:
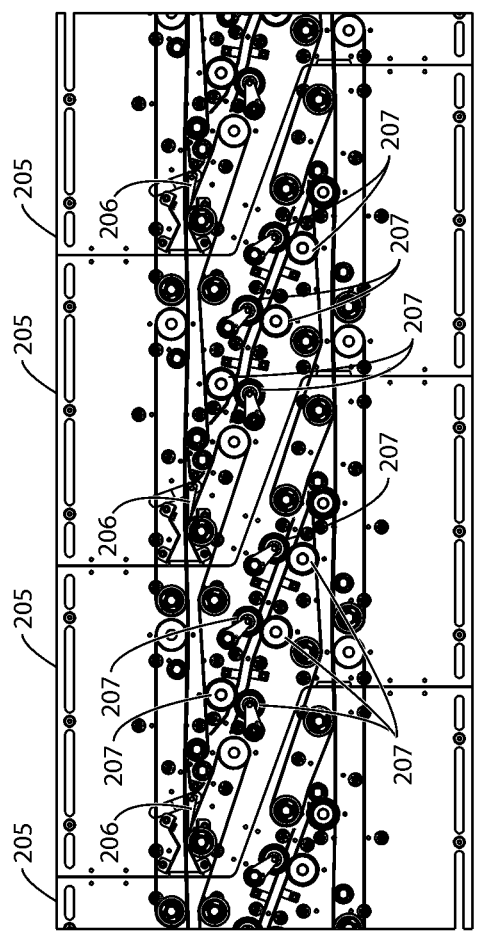
FIG. 5C shows a front view of two complete collator units/modules that are sandwiched between two partial collator units/modules.

FIG. 5A shows an exemplary collator 20 that has five modules 205. FIG. 5B shows the details of one module 205. FIG. 5C shows four collating modules 205 fitted together, with the two center modules 205 visible in their entirety. Mail pieces flow through the collator 20 face down, so that, viewed from the perspective of the drawings, only their top edge is visible.

Each collator module 205 can capture an identified mail piece 201 arriving via the conveyor belts at its upper left input by the Collating Computer activating the module's 205 diverter 206 and stopping the mail piece between the pinch rollers 207 of its buffering region. When, subsequently, another mail piece arrives via the lower input the Collating Computer can cause the buffer region to eject its mail piece at just the right time so that the two mail pieces are "stacked" at the merging position and exit via the conveyor belts at the lower right. The buffering region accelerates and decelerates letters at the rate of around 17 G's (17 times the acceleration due to gravity) under the command of the Collating Computer.

The physical collation algorithm is perhaps most readily envisioned using a "jump on the caboose" analogy: imagine each group of identified statement pack candidates as a train of letters flowing into the collator's 20 upper left input. The first identified mail piece 201 in each train flows along the upper path to the right-most module, where the Collating Computer directs it to be diverted and captured. The next identified mail piece 201 is captured in the next-to-the-right-most module, and so on. The last identified mail piece 201 in the train, the "caboose", is diverted using the same logic but doesn't stop. It continues onto the lower path, and as it passes through each subsequent module the next identified mail piece 201 in the train "jumps" on top of it. When the stack emerges from the last module, the first identified mail piece 201 in the train is on top.

Since the "caboose" in every group of statement pack candidates never stops or even slows down, no identified mail piece 201 behind a "caboose" is ever impacted by the collation process of the StatementPack™ in front of it.

As long as the rule of adjacency is adhered to, a constant stream of identified mail pieces 201 can flow smoothly through the collator 20, even if the gap between mail pieces 201 varies widely (above a certain minimum). This is important because it's common for the high speed letter feeder/singulator 10 of the type used on this system to create widely variable gaps between mail pieces 201, due to the widely varying thicknesses and weights of the mail pieces 201 themselves, as well as wear and tear on the feeder/singulator's 10 pickoff rollers 102.

In the less-common case where the gap between mail pieces 201 is too small or non-existent (two letters overlapping one another), those mail pieces 201 will not be diverted; instead they will continue along the upper path and be deposited in a hopper.

In cases where the rule of adjacency is broken, the Mailing Computer will direct that mail pieces 201 be diverted by the Collating Computer from the lower path into a different hopper.

In both cases, the machine will continue running and operators O will be prompted to process the diverted mail pieces 201 appropriately.

Overall operational collator 20 flow diagrams appear, sequentially, in FIG. 5D in rows A, B, C, and D. Since the subject process is in continuous motion, each row (A, B, C, and D) represents a "snapshot" of the subject collation process as the documents within a StatementPack™ come together. FIG. 5D illustrates the basic steps in collating the multiple documents into grouped (same person and the same address) StatementPack™ mail items or "mail packs" for short. FIG. 5D row A shows the input documents entering on the left of the collator 20. In this example, row A shows that for StatementPack™ "A" (referred to as the "A" group or "A" pack and likewise the "B" group or "B" pack, etc.) the last document/letter of the "A" group/pack has been diverted to the lower a pair of belts while the $1^{st}$ document/letter of the "A" group/pack is being diverted to fit over the last document/letter of the "A" group/pack (the "A" group/pack has only two total documents/letters). Behind the "A" group/pack is the $1^{st}$ document/letter of the "B" group/pack (the "B" group/pack has only one page), a questionable document, the $1^{st}$ document/letter of the "C" group/pack, the $2^{nd}$ document/letter of the "C" group/pack, and the last document/letter of the "C" group/pack. All of the groups/packs are progressing to the output path on the right of the figure. Row B shows that the $1^{st}$ document/letter of the "A" group/pack is now on top of the last document/letter of the "A" group/pack and all of the other documents/letters have advanced towards the output, with the $1^{st}$ document/letter of the "D" group/pack now entering on the far left. Row C shows the subject process at a later stage in the collation scheme with the "A" group/pack assembled StatementPack™ 401 (thus, generalized mailing groups/packs 401 are generated, wherein each mailing group/pack 401 contains identified mail pieces (letters/documents/etc.) that all go to the same recipient address) at the output, the $1^{st}$ document/letter of the "B" group/pack held in the lower divert, the questionable document entering the upper divert, the $1^{st}$, $2^{nd}$, and last documents/letters of the "C" group/packs coming together on the lower track of belts, and $1^{st}$, $2^{nd}$, $3^{rd}$ and $4^{th}$ documents/letters of the "D" group/pack continuing in the collator 20. Row D shows a later point in the collation process in which the "C" group/pack assembled StatementPack™ 401 is now exiting at the output, the "D" group/pack is in collation, and the "E" and "F" groups/packs are entering the subject collator 20 for processing. The upper divert contains the questionable document and the lower divert contains the $1^{st}$ document/letter of the "B" group/pack that is awaiting further documents/letters, and both will be handled by the machine operator O in a suitable fashion for their mailing.

Buffer

Figure 8A:
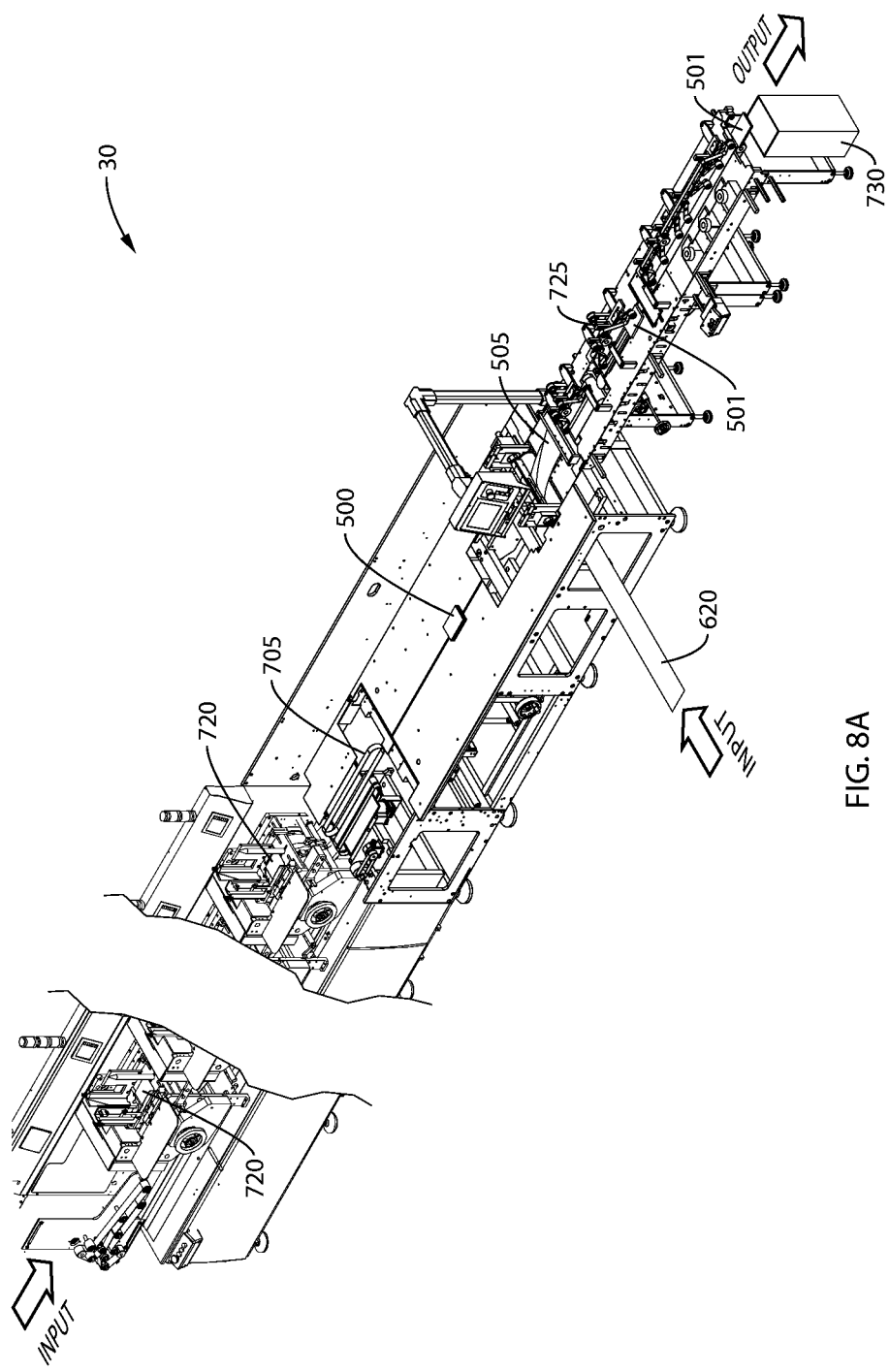
FIG. 8A shows a perspective view of the containerizer employed with the subject invention.
Figure 8B:
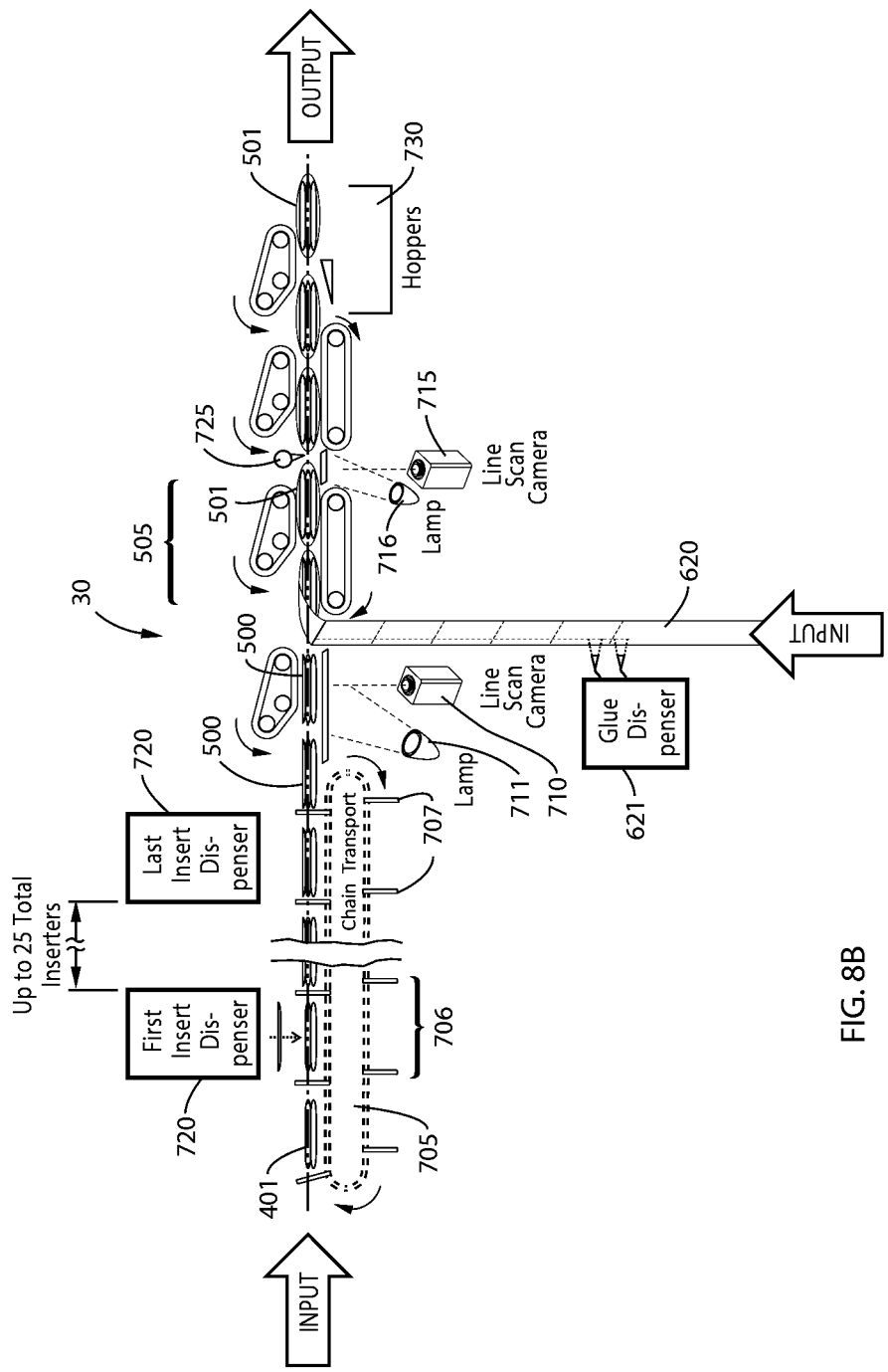
FIG. 8B shows an operational diagram for the subject containerizer when the containerizer is functioning as a wrap inserter in which both desired inserts are selected for inclusion into each mail pack and the combined mail pack with desired inserts is wrapped in an addressed mail wrapper.

Stacks of collated, but unwrapped, StatementPacks™/groups/packs 401 emerge from the collator 20 at speeds of approximately 150 inches per second, but with highly irregular spacing due to the varying numbers of identified mail pieces 201 in each mail group/pack/stack 401. A buffer associated computer 26 is seen in FIG. 1. Before the groups/packs/stacks 401 can be transferred onto the containerizer/wrap inserter base or track 705 (as seen in FIG. 8A and FIG. 8B) (belt, chain, or equivalent structure) of the containerizer/wrap inserter 30 (FIG. 1) they must be slowed down to match the speed of the containerizer/wrap inserter track 705 and the associated track receiving slots 706 (as seen in FIG. 8B) that are normally spaced at approximately 13.5 inch intervals, and synchronized with the track's 705 relative position so that the mail groups/pack/stacks 401 fit properly between the mechanical fingers 707 in the track 705. These timing tasks are the responsibility of the Buffering Computer and buffer 25.

If the subject StatementPack™ System were making single-page or all equal-page identified mail piece packs it would run at a nearly constant speed. But, since it is making multi-page mail packs 401, synchronizing is challenging because of the widely varying speed of the containerizer track 705 as it tries to match the average rate at which groups/packs/stacks 401 are emerging from the collator 20. FIG. 6E illustrates what that average rate might look like for a simulated batch of 300 StatementPacks™ 401 (identified mail groups/packs/stacks of letters/documents/etc.) containing between two and five (or more) identified mail pieces 201 each.

The buffer's 25 other job is to catch and hold groups/packs/stacks 401 emerging from the collator 20 when the containerizer/wrap inserter base 705 stops suddenly, for example when there is a jam. Of course when such an event occurs the feeder/singulator 10 will be stopped by the Mailing Computer as quickly as possible, but all the material flowing through the collator 20 and the buffer 25 must be brought to a controlled stop (and subsequent restart) by the Buffering Computer so that no operator O intervention will be necessary, except for at the location of the original jam event.

One of the biggest challenges for the buffer 25 is moving around packs 401 of identified mail pieces without dropping any of them or even disturbing the physical integrity of the packs 401. It is important to keep the packs 401 neat so that they do not jam going into the mechanical slots 706 in the track of the wrap inserter 30.

To accomplish these objectives the buffer 25 consists of a series of identical belt drive sub-assemblies 503 as seen in FIGS. 6A, 6B, 6C, and 6D. Each set of upper 510 and lower 515 belts (seen in FIGS. 6B and 6C) can reliably grip a pack of identified mail pieces 401 of any thickness meeting USPS folded mail guidelines. The sub-assemblies 503 are spaced close enough together that packs of identified mail pieces 401 are held securely as they are passed from one set of belts 510 and 515 to another subsequent set of belts 510 and 515 further along the buffer 25, towards the output end. Each sub-assembly's upper 510 and lower 515 belts are driven by independent motors so that acceleration forces applied to the tops and bottoms of the packs 401 are roughly equal. The motors for each pair of upper 510 and lower 515 belts are electronically geared together by the Buffering Computer so that they move as if on a single axis. The input section of each sub-assembly 503 features a wide V-shaped belt driven path 516 to draw packs 401 in without compromising the alignment of the individual identified mail pieces. The belts 510 and 515 of each sub-assembly 503 are physically independent of the belts on neighboring sub-assemblies 503, so that they can be moved independently when necessary without any physical conflict.

Figure 6A:
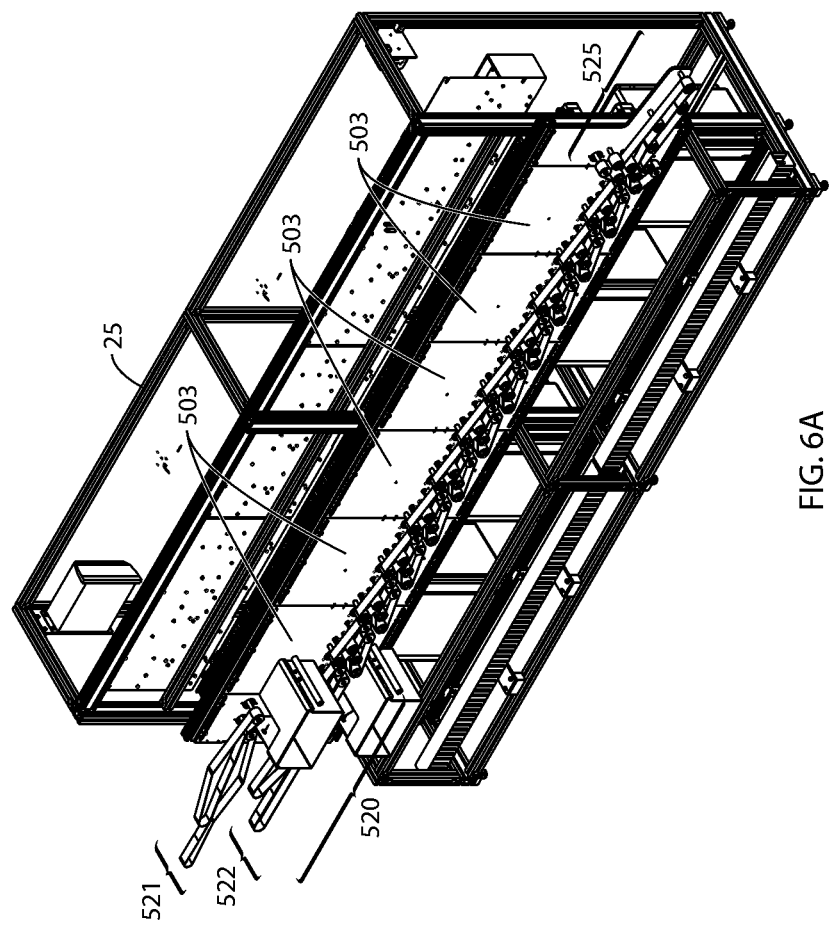
FIG. 6A shows a perspective view of a mail piece pack buffer disclosed for use with the subject invention in which each formed mail pack's transfer speed is adjusted to match the operational speed of a subsequent containerizer, wherein paired transferring belts are mounted in a plurality of linkable units or modules to form the employed buffer.
Figure 6C:
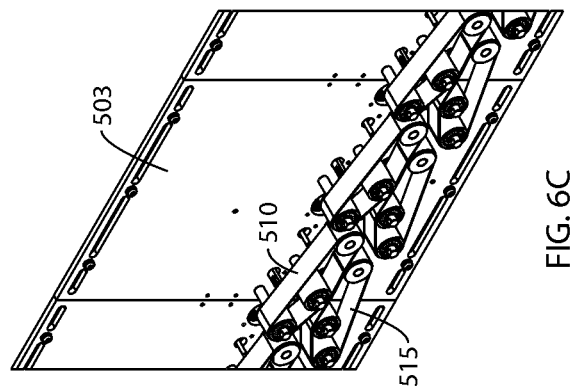
FIG. 6C shows a perspective view of one unit/module of the subject buffer sandwiched between two partial units/modules.
Figure 6B:
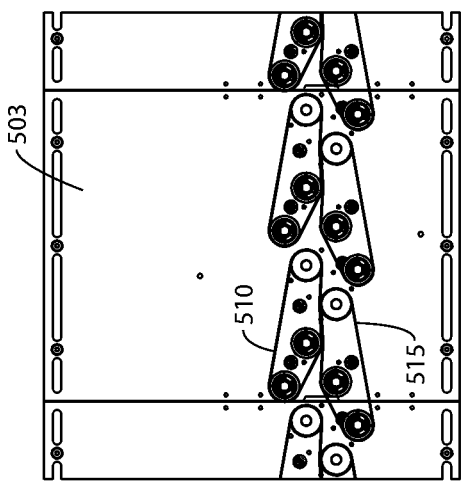
FIG. 6B shows a front view of one unit/module of the subject buffer sandwiched between two partial units/modules.
Figure 6D:
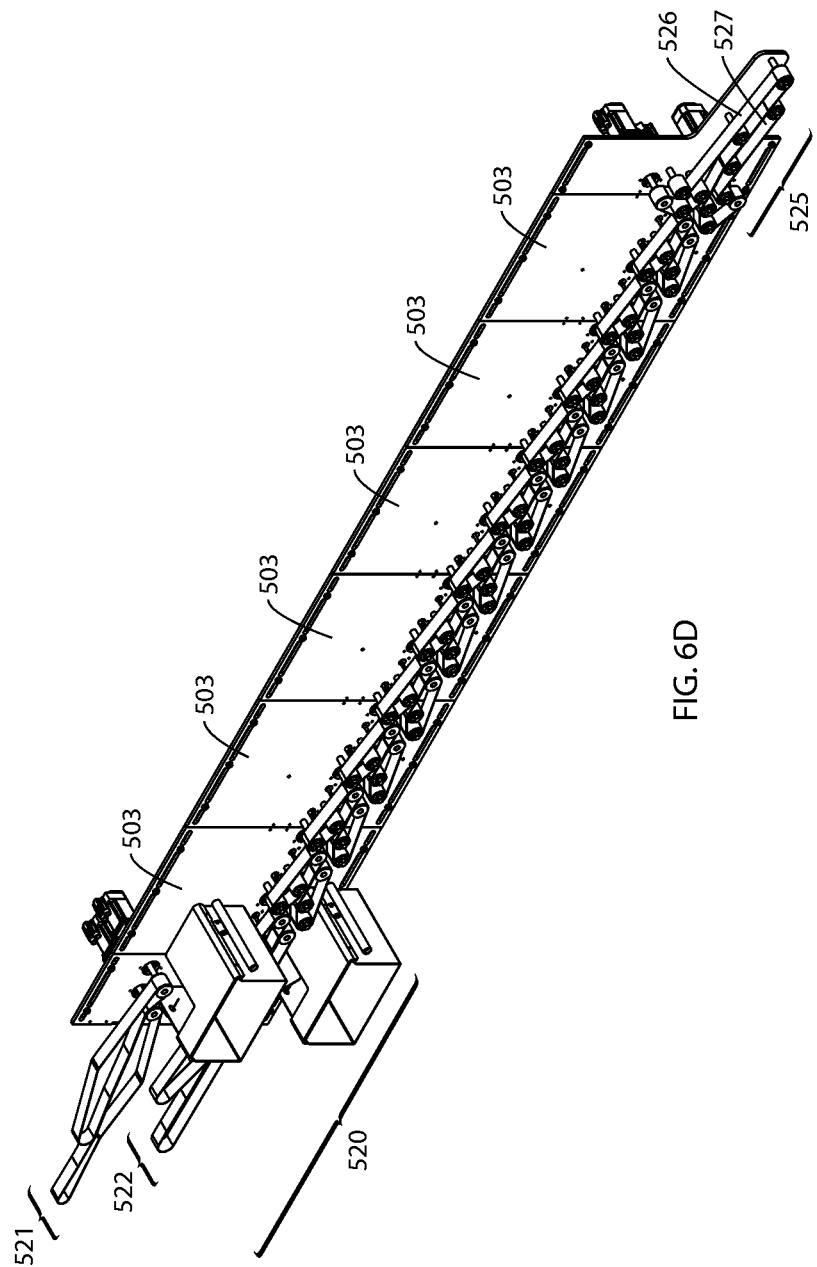
FIG. 6D shows a close-up perspective view of the mail piece pack buffer disclosed for use with the subject invention in which each formed mail pack's transfer speed is adjusted to match the operational speed of the subsequent containerizer, wherein paired transferring belts are mounted in a plurality of linkable units or modules to form the employed buffer.
Figure 6E:
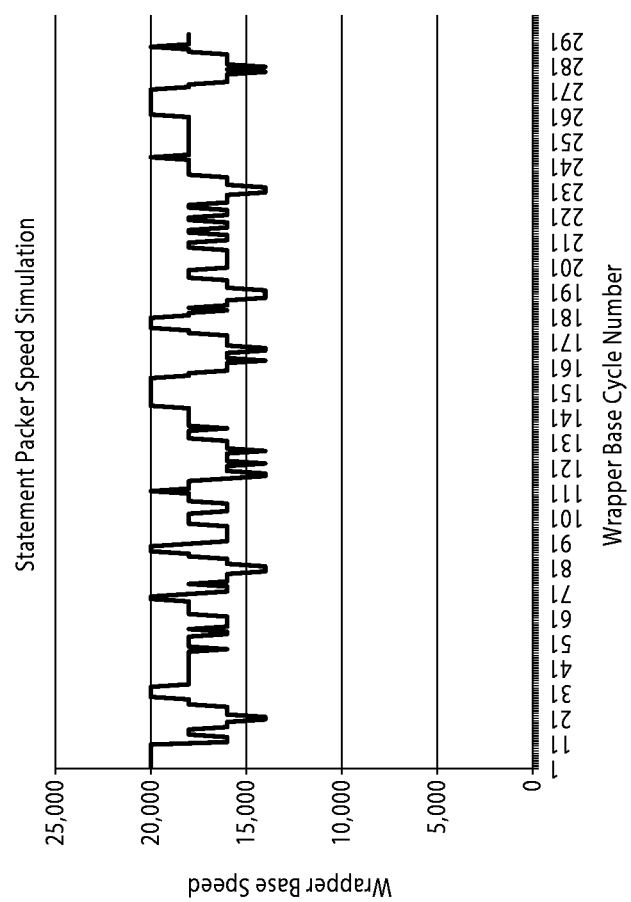
FIG. 6E illustrates what may occur when the subject system is making a plurality of mail piece packs and shows what that average rate might look like for a simulated batch of 300 packs containing between two and five mail pieces (letters, billing statements, and the like) each, wherein the subject buffer assists in smoothing out the mail pack delivery rate between the collator and the containerizer.

The entire buffer module 25, long enough to hold at least six groups/packs/stacks 401 of StatementPacks™, is depicted in FIGS. 6A and 6D (with entry means 520 from the collator 20 and exit means 525 to the containerizer/wrap inserter 30 shown). For FIGS. 6A and 6D, at the left end of the subject buffer 25, conveyor belts are seen that bring packs 401 to the buffer 25 from the collator 20. Unless the subject machine is starting or stopping, these left-most conveyor belts 521 and 522 always move at a constant speed of about 150 inches per second (or other desired speed). At the right end are conveyor belts 526 and 527 (see FIG. 6D) for carrying the packs 401 into the track 705 of the containerizer/wrap inserter 30. The Buffering Computer ensures that these right-most conveyor belts 526 and 527 always move at the same speed as the containerizer/wrap inserter track 705, which of course can be as low as zero but is commonly between 50 and 80 inches per second. From the speed simulation graph seen in FIG. 6E, it should be apparent that most of the time, without the buffer 25 the speed of the containerizer/wrap inserter 30 would be either accelerating or decelerating, but the Buffering Computer hunts constantly for the base speed that will prevent the buffer 25 from over- or under-filling the containerizer/wrap inserter 30.

Each belt-driven buffer sub-assembly 503 can move as if on its own intelligent axis, completely independently of its neighbors, but importantly, each sub-assembly 503 also has the ability, under the command of the Buffering Computer, to logically connect itself to a different axis through the use of electronic gearing. This makes it possible for one set of belts 510 and 515 to copy another axis's motion, as though they were physically connected together with actual gears or timing belts.

To demonstrate the utility of this feature, consider a particular moment in time when one end of a pack 401 is pinched between the belts 510 and 515 of the last, or right-most, buffer sub-assembly 401 on the buffer 25, and the other end by the conveyor belts 526 and 527 of the transfer means 525 that will carry it into the track 705 of the containerizer/wrap inserter 30. As stated before, these conveyor belts 526 and 527 always move at the same speed as the containerizer/wrap inserter track 705, which is anywhere between zero and 80 inches per second and is usually accelerating or decelerating. If the last buffering sub-assembly 503 were not nearly or exactly matching this motion, the pack 401 would be pulled apart or mashed together. By the Buffering Computer electronically gearing the axis for these pinch rollers to the motion of the containerizer/wrap inserter track 705, such motion mismatch is prevented, even if the containerizer/wrap inserter track 705 does something unexpected.

Each axis also has the ability to be electronically geared by the Buffering Computer to a virtual axis, a purely theoretical motion that can serve as master to one or more slave axes even though no individual motor or shaft encoder is carrying out the actual master motion profile.

Finally, each axis has the ability to engage or disengage electronic gearing very quickly under the command of the Buffering Computer. This enables coordinated, sequential, multi-axis motion, for example in the case of a bucket brigade, where adjacent physical axes that are handling the same pack 401 make use of electronic gearing, but the moment the upstream set of belts releases the stack, the Buffering Computer can direct that the two axes go their separate ways again.

When packs 401 arrive from the collator 20, the buffer 25 keeps them moving to the right at about 150 inches per second (or any outer suitable set speed) until there's no more room, at which time the packs 401 are decelerated to match the speed of the containerizer/wrap inserter track 705 and their position-adjusted to the proper phase angle of the containerizer/wrap inserter track 705. These motions are executed using electronic gearing commands with both real and virtual master axes, so that the buffering process remains under control of the Buffering Computer even if an unexpected event, such as an inserter 30 jam, occurs. Once each pack 401 is both speed- and position-synchronized, the axes holding the pack 401 are slaved to the base by the Buffering Computer until the pack 401 is released. The accelerations and decelerations are limited to about 6 G's to reduce the chance that packs 401 slip from the buffer's 25 grip.

When the buffer 25 is full, nearly all of its axes will be slaved to the containerizer/wrap inserter track 705. This ensures that no matter what motion the containerizer/wrap inserter 30 carries out, even if it is jogged by the operator O in a very rapid, stop/start, unpredictable way, all of the buffer's 25 contents will be deposited neatly into the track 705 of the containerizer/wrap inserter 30.

Figure 6F:
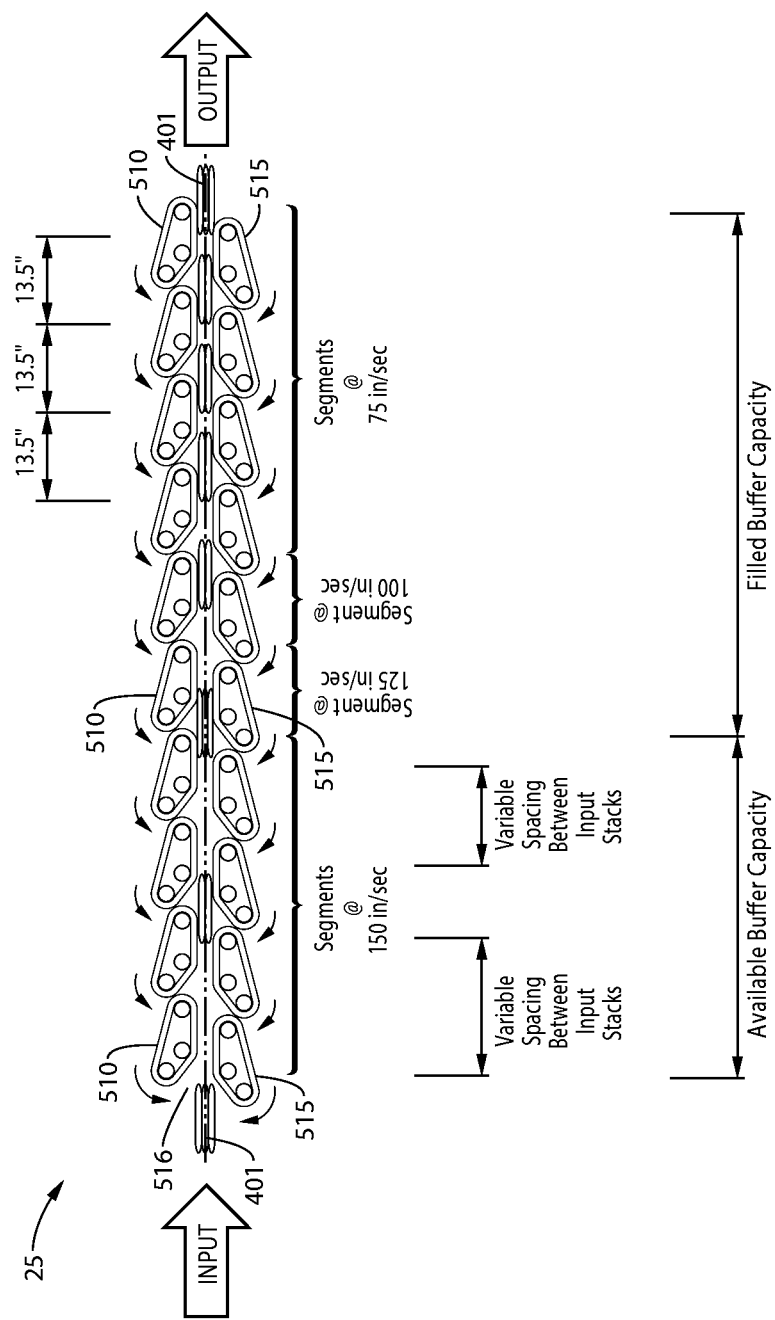
FIG. 6F shows an operational diagram of the subject buffer transferring mail packs between paired belts from the collator to the subsequent containerizer.

A summary operational flow diagram for the subject buffer 25 is shown in FIG. 6F. Each assembled, variable page-count, but un-wrapped, StatementPack™ or pack 401 enters the buffer 25 at the input point 520 from the collator 20 (far left edge of FIG. 6F). The variable document/letter-count StatementPacks™ 401 move between computer-controlled lower 510 and upper 515 belt pairs. The general purpose of the buffer 25 is to regulate the transport speed at which each variable page-count pack 410 is moving to facilitate entry, via the output means 525, into the containerizer/wrap inserter 30 at a relatively constant rate. Various exemplary transport speeds for packs 401 are noted in FIG. 6F, as are comments concerning operational parameters.

Printer

For exemplary purposes only, and not by way of limitation, a printer is included in the illustrated embodiments of the subject invention. It is stressed that the subject assembly system does not have to include a printer for placing images on the mailing container/envelope/wrapper into which each pack 401 is inserted for mailing, however, one preferred high-speed embodiment does include a printer 40 and associated computer 41, as seen in FIG. 1 (and in detail in FIGS. 7A-7D), that prints images, including mailing addresses, on a continuous stream of paper that subsequently forms an individual mail wrapper around each pack 401 of identified mail pieces and desired inserts. Other embodiments of the subject system may utilize traditional envelopes printed on demand for each pack 401 by an included printer, pre-addressed traditional envelopes having desired images, traditional envelopes that have a transparent window that permits a recipient's address on an internal document to show through, and equivalent means. Thus, as indicated, the subject system describe herein utilizes a printer 40 for printing recipient addresses and desired images on mailing wrappers that enclose each pack 401 and any desired mail inserts.

Every time the subject Mailing Computer decides that a particular identified mail piece 201 will be "last" in a pack 401, it informs the Printing Computer of the identities of all the identified mail pieces 201 that will make up the associated pack 401. This allows the Printing Computer to begin preparing all the information necessary to compose the image to be printed on the outside of each mailed container/wrapper. Typically printed information includes graphical information, such as company logos and marketing artwork; personal information, such as recipient destination addresses, recipient names, and USPS-compliant symbols and notations.

Image composition needs to be completed by the Printing Computer and the print head 610 made ready prior to the moment when the corresponding form on the container/wrap envelope material (usually a paper web delivered from a roll of paper 42) physically passes under the print head 610. Due to the physical constraints of the equipment layout in the subject StatementPack™ System, the print head's 610 location is nearly 20 documents upstream of the physical point at which the container/wrapper and its corresponding contents come together.

The position of the corresponding pack 401 that is 20 documents upstream along the containerizer/wrap inserter's track 705 is very near the point at which the buffer 25 and containerizer/wrap inserter 30 meet. Thus, the total composition time available may be as little as the transit time through the buffer 25, or well under one second.

In addition, the rate at which successive compositions are completed must be at least as high as the maximum speed of the machine, which is around one document about every 180 milliseconds. To attain these composition speeds for letter-sized, four color (CMYK) images at a density of 300 by 600 dots per inch using COTS computing equipment requires multiple CPUs and pipelined software to enable the CPUs to work simultaneously.

The subject invention's Printing Computer uses both these means plus pipeline modifications that allow initial stages to be launched earlier by postponing momentarily-uncertain tasks to later stages. For example, when the "first" candidate of a StatementPack™ is identified, composition of the graphical template for that envelope can commence, even though the list of recipient names is not yet complete, because the graphical template doesn't depend on those additional names. By the time the "last" candidate is identified, that last recipient name could, in theory, be the only part of the image left to be composed, allowing the last stage to complete very quickly.

Figure 7A:
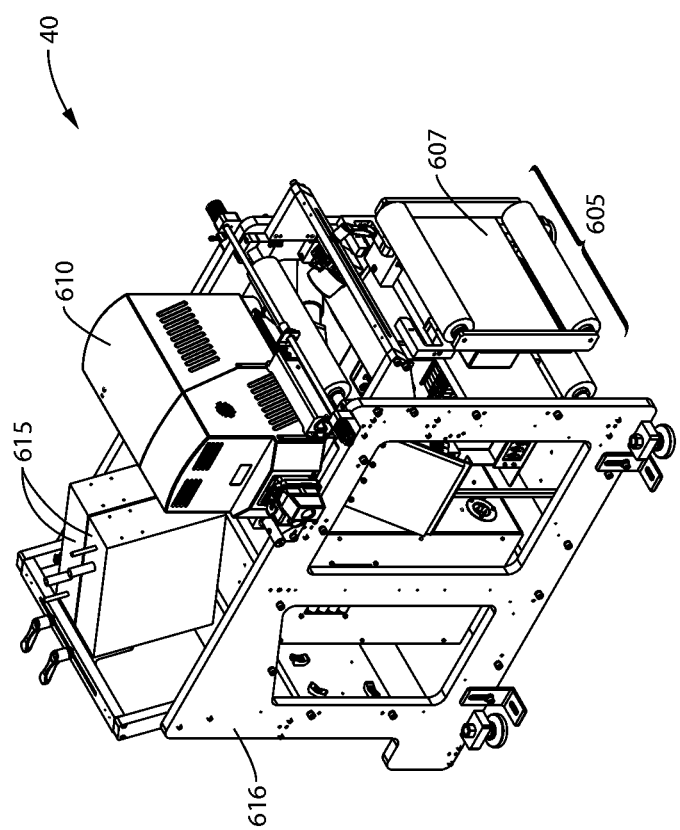
FIG. 7A shows a perspective view of the envelope/address printer utilized with the subject invention.
Figure 7B:
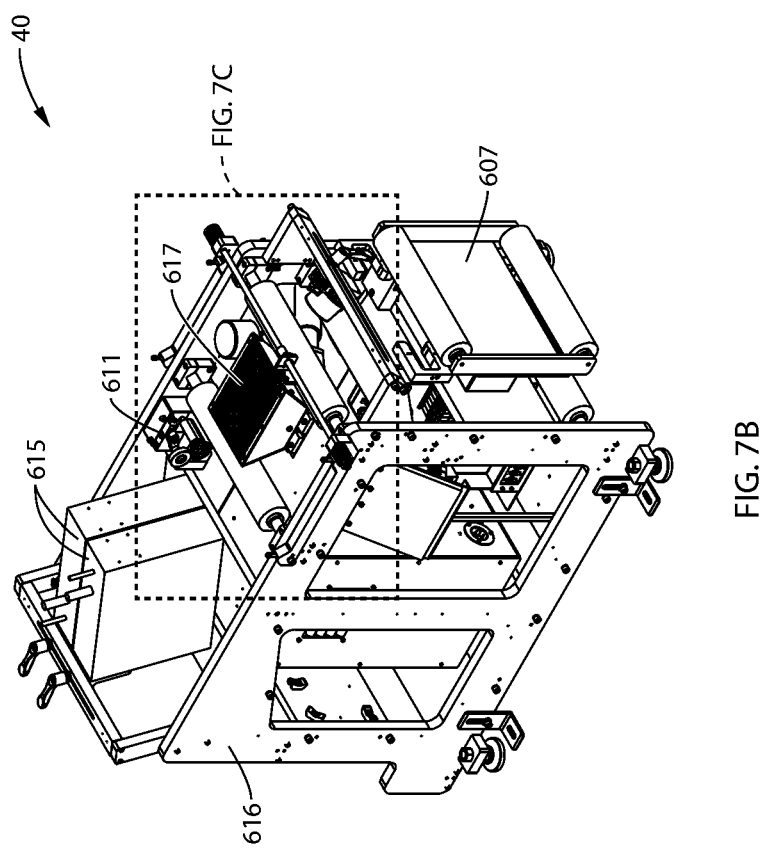
FIG. 7B shows a perspective view of the subject printer in which the print heads have been removed to show the vacuum platen that stabilizes the paper region of the web that is printed on by the printing heads.
Figure 7C:
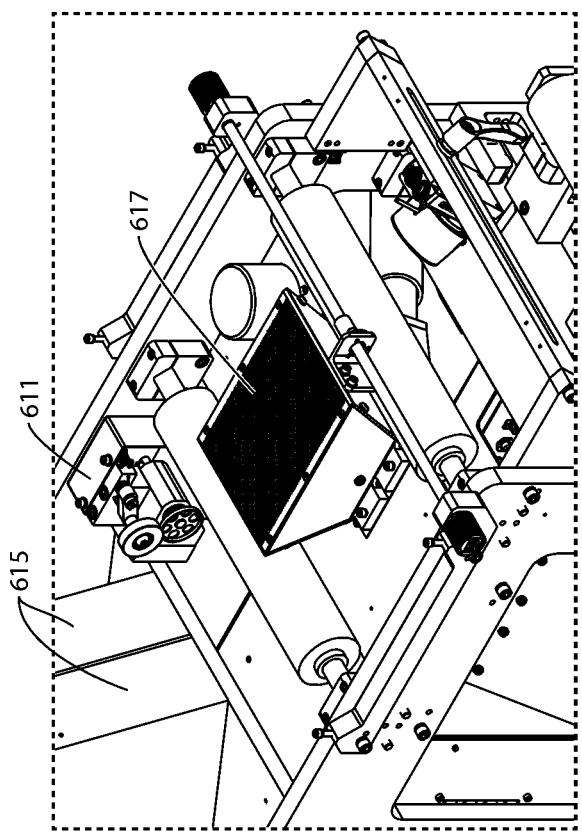
FIG. 7C shows a close-up perspective view (see FIG. 7B for a dashed box that is enlarged in this view) of the subject printer in which the print heads have been removed to show the vacuum platen that stabilizes the paper region of the web that is printed on by the printing heads.

Once the entire image is composed by the Printing Computer and transferred to the print head 610, the ink deposition process can begin. FIGS. 7A, 7B and 7C depict the mechanical system for depositing ink onto paper. The paper web has been removed for visibility. The paper web enters at the lower right 605 from a paper roll delivery station 42, crosses the web aligner 607 which orients the web properly from side to side, then passes under the print head or heads 610, the shaft encoder 611, and finally the dryer 615, after which it exits the print stand 616, glue applied by a glue dispenser 621, thus becoming paper web 620 (seen in FIGS. 8A and 8B), and enters the containerizer/wrap inserter 30 to merge with packs 401 on the track 705 at the wrapping point 505 (seen in FIGS. 8A and 8B).

In a sense, all the print head 610 does by itself is shoot ink, like a squirt gun with perhaps 10,000 nozzles. It is up to the subject application to 1) present the paper substrate accurately and 2) provide electronic tachometer pulses that accurately represent the motion of the paper. Only if these two tasks are accomplished adequately does the print head 610 have any chance of producing acceptable quality images.

Controls built into the print head 610 are responsible for properly correlating each individual pixel from input image bitmaps with specific jetter nozzles and tachometer pulses.

Paper Substrate Presentation

The print head's jetter array spans a flat rectangular area approximately 4.25"×8.5" in the exemplary case (other array sized are considered to be within the realm of this invention). Each image, therefore, is assembled gradually over the course of more than eight inches of paper travel. In order for the image quality to be acceptable the paper has to be:

1. Very close to the array, because the microscopic droplets emitted by the jetters slow down and drift off course after more than about 1 mm of travel through the air, and 2. Parallel to the array, so that the droplets emitted by the 10,000 or so jetters all strike the paper after the same amount of travel time through the air.

Of these two challenges, the parallelism requirement is the most difficult. The print head's documentation (from a typical supplier) states clearly that "The accuracy with which the surface to be printed moves under the head determines the quality of the result." The reason is a paper web drawn taught in space tends to have ripples in it. This page rippling would make the printed images have ripples too.

In the case of a 1-dimensional jetter array such as on a Kodak 9100 print head, the paper is drawn taught over the crown of a roller that is held in a fixed mechanical position parallel to the jetter array. The approximate 7° entering vs. exiting angle of the paper keeps a small arc of the paper's length held fast against the roller's surface. This keeps the paper parallel to the jetters but only in that single dimension. In the case of a 2-dimensional jetter array like the one on the subject StatementPack™ printer 40 a different mechanical solution is required.

Various possible solutions to this problem were evaluated. The selected solution proved to work quite well. The solution is referred to it as the vacuum platen 617 which is depicted in FIG. 7B and enlarged in FIG. 7C. As seen in FIGS. 7B and 7C, the vacuum platen 617 sets up a slight vacuum behind a smooth metal platen/plate 617 with a 2-dimensional array of through-holes in it. Ambient air pressure then presses the paper flat against the plate while it moves under the jetter array of the head 610. The vacuum forces are strong enough to overcome the paper's rippling forces but not strong enough to otherwise interfere with paper travel. With the paper held fast against the platen/plate 617, covering all the holes, the air flow through the platen/plate 617 is negligible, which helps to keep the air space between the jetter array and the paper relatively quiet. This aids in producing smooth, predictable flow of ink drops across the airspace between the jetter array and the paper.

Tachometer Signal Presentation

Conventional 1-dimensional array ink jet print heads require one tachometer pulse per dot (i.e. a 300 dot-per-inch resolution requires one tachometer pulse every $300^{th}$ of an inch). Printing horizontally-aligned pixels is easily accomplished simply by firing multiple jetter modules simultaneously.

In contrast, the subject system's 2-dimensional array print head 610 requires as many as 25,400 pulses per inch. This is because of the diagonal alignment of the jetter nozzles, which makes it possible to print horizontal pixels very close together, but at the cost of requiring any two adjacent horizontal pixels to be printed at different times.

It is more accurate to say that to print two adjacent pixels using neighboring diagonal nozzles it is necessary for the droplets that will form them to be shot from their respective nozzles at two different positions of the web. Visualizing the paper traveling vertically, in order for the second pixel to appear right beside the first, the print head must be able to resolve distances much smaller than the about $\frac{1}{300}^{th}$ or $\frac{1}{600}^{th}$ inch nominal spacing between pixels. It must be a small fraction of the nominal pixel-to-pixel dimension so that slight variances in horizontal alignment can be adjusted out.

The subject system's solution offers a resolution of about $\frac{1}{45}^{th}$ of $\frac{1}{600}^{th}$ of an inch. This provides the print head 610 with sufficient resolution to produce acceptable quality images on bond paper.

Tachometer Signal Conditioning

Printing for the containerizer/wrap inserter application requires the print head 610 to produce good images even under stop/start conditions, such as when the operator O is "jogging" the machine. This is complicated by the fact that when the paper stops, or appears to be stopped, it actually may oscillate back and forth due to tiny mechanical vibrations. These motions are picked up by the super-sensitive shaft encoder 611 and converted into tachometer pulses that accurately reflect the oscillatory motion.

Since the print head 610 cannot distinguish forward motion from backward motion, images printed under these conditions would be ruined. To prevent this, the tachometer pulses have to be filtered before being sent to the print head 610.

The subject printer module 40 uses a hard-wired circuit to detect tachometer pulses indicative of reverse motion, or forward motion over already-printed area, and suppress them. This ensures the print head's tachometer circuitry receives only pulses representing new forward progress, ensuring that jetter nozzles passing over each target pixel position are fired one and only one time.

While the filtering calculations ensure image quality for low-speed, stop/start events, they must also be fast enough not to interfere with image quality during high speed printing, when tachometer pulses occur well over one million times per second. The subject printer module 40 uses an FPGA, a type of integrated circuit, so that all the filtering calculations can be carried out in real time on a single chip. This results in negligible tachometer pulse delay even under the most demanding circumstances.

Figure 7D:
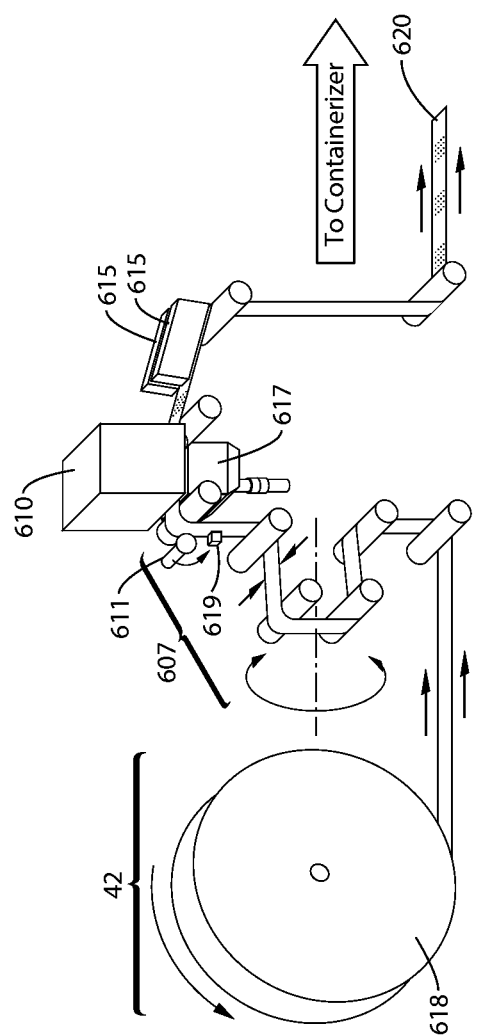
FIG. 7D shows a schematic diagram of the subject printer with an associated roll of web paper and entry and exit web-transfer rollers.

FIG. 7D shows an operational diagram for the printer 40 that is interfaced with the paper delivery means 42. A roll or web paper 618 is fed by a standard unwinding apparatus into the printer 40 via the web aligner 607 which is a series of rollers that straighten the incoming web. A cue mark sensor 619 helps match the printing to the web location. A shaft encoder 611 helps track the operation of the printer 40. The web travels between the print head 610 and the vacuum platen 617 which stabilizes the web for printing. One or more dryers 615 then dry the printed web 620 before the web 620 moves on to the containerizer/wrapper 30.

Containerizing/Packaging/Finishing

The remaining subject StatementPack™ assembly steps or the "finishing," i.e. containerizing/wrapping/packaging, gluing, cutting, and outstacking, are now described and shown in FIGS. 8A and 8B. The "inside-outside match verify" is now described first (it is noted that all of the finishing processes are overseen by the Finishing Computer).

FIG. 8A shows the containerizer/wrap inserter 30 of the subject invention. It is noted that only the first and last inserter dispensers 720 are shown in FIG. 8A, however there may be up to 25 insert dispensers 720 or more. The complete subject containerizer/wrap inserter 30 is best viewed by referring to FIG. 8A and FIG. 8B in combination. Beneath the deck of the containerizer/wrap inserter track 705 and just upstream of the physical point at which the wrapper form and its corresponding contents come together 505 is a line scan camera 710 and lamp 711 that, through a glass plate, captures an image of the face of each document/letter on the bottom of each pack/stack 401. This is the whole reason the packs 401 were turned face down prior to commencement of the collation process. Analysis of the image by the Finishing Computer reveals the IMB and consequently the serial number of the mail piece 201, enabling the Finishing Computer to verify that it is the one it is supposed to be. Any mismatch invalidates the entire pack 401 and leads the Finishing Computer to divert the pack 401 and interact with the operator O to rectify the situation.

Just downstream of the physical point at which the wrapper web form and its corresponding contents come together 505 is another beneath-the-deck barcode reader comprising a line scan camera 715 and lamp 716. Through another piece of glass it captures an image of the face of the outside of the wrapped pack 501, allowing the control system to read the barcode laid down there by the Printing Computer, once again to confirm that it is the one it is supposed to be. Any mismatch invalidates the entire wrapped pack 501 and diverts it as above.

Finally, when completed wrapped packs 501 that have passed all these tests reach the outstacker 45, the barcode on the face of the outside of the wrapped pack 501 is read one last time, as a triple-check, to ensure that once again, it is the one it is supposed to be. Any mismatch invalidates the entire pack 501. This triple-check system, controlled by the Finishing Computer, has proven faultless in over two years of live production at preventing inside-outside mismatches from entering the mail stream. This track record establishes the confidence to allow mail pieces and desired inserts to be delivered to an address printed on the outside of the wrapper/package, rather than simply the one viewable through the window of a send envelope for each mail piece.

It is this transparent viewing window that, for decades, has protected mailers from having important transactional documents delivered to the wrong recipient. One of the biggest risks of the entire StatementPack™ concept is abandoning the security of the send envelope window. This is why the triple-check is essential for the subject printed wrapper system.

An operational flow diagram is seen in FIG. 8B for the subject containerizer/wrap inserter 30. An associated computer 31 (seen in FIG. 1), interfaced with the other system computers, controls the containerizer/wrap inserter 30. The term "containerizer" is utilized since the each mail pack 401 is placed into a mailing "container" or wrapper by this device. Mail packs 401 enter the containerized/wrap inserter 30 from the left, usually delivered from the buffer 25 that has matched the delivery speed of the mail packs 401 to the containerizer/wrapper belt 705. Each pack 410 fits between retaining fingers 707 within a receiving space 706 on the belt 705. The packs 401 are transported under a plurality of insert dispensers 720 that may be purchased from various suppliers and adapted to the subject system or fabricated. The insert dispensers 720 contain inserts that may be added to any one of the packs 401 as it passes below the dispensers 720. The desired insert addition process is regulated by the associated computer controller.

Desired inserts now rest on top of the identified mail pieces within each pack 401 forming a stack of mailable items 500. The stack of mailable items 500 is verified by the line scan camera 710 and associated programming. The final mailable package 501 is then formed by being containerized 505 in a mailing wrapper by the incoming stream of addressed web paper 620 from the printer 40 and, after applying glue 621 and wrapping around the items to be mailed 505, the addressed web cut 725 into the individual mailable packages 501. Each wrapped or containerized mailable package 501 is scanned again by the next camera 715 to verify no errors have occurred. If an error occurs the incorrect mailable package is diverted into a hopper(s) 730 for processing by the operator O. The containerized mailable packages 501 are then transported to the outstacker 45 for further processing.

Figure 9A:
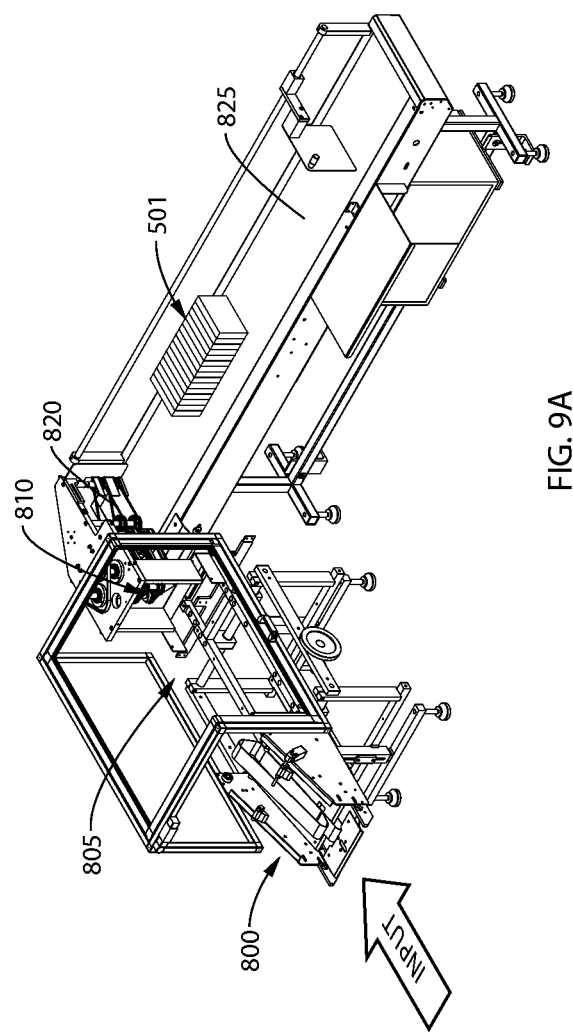
FIG. 9A shows an outstacker employed with the subject invention that accepts containerized mail packages from the containerizer.
Figure 9B:
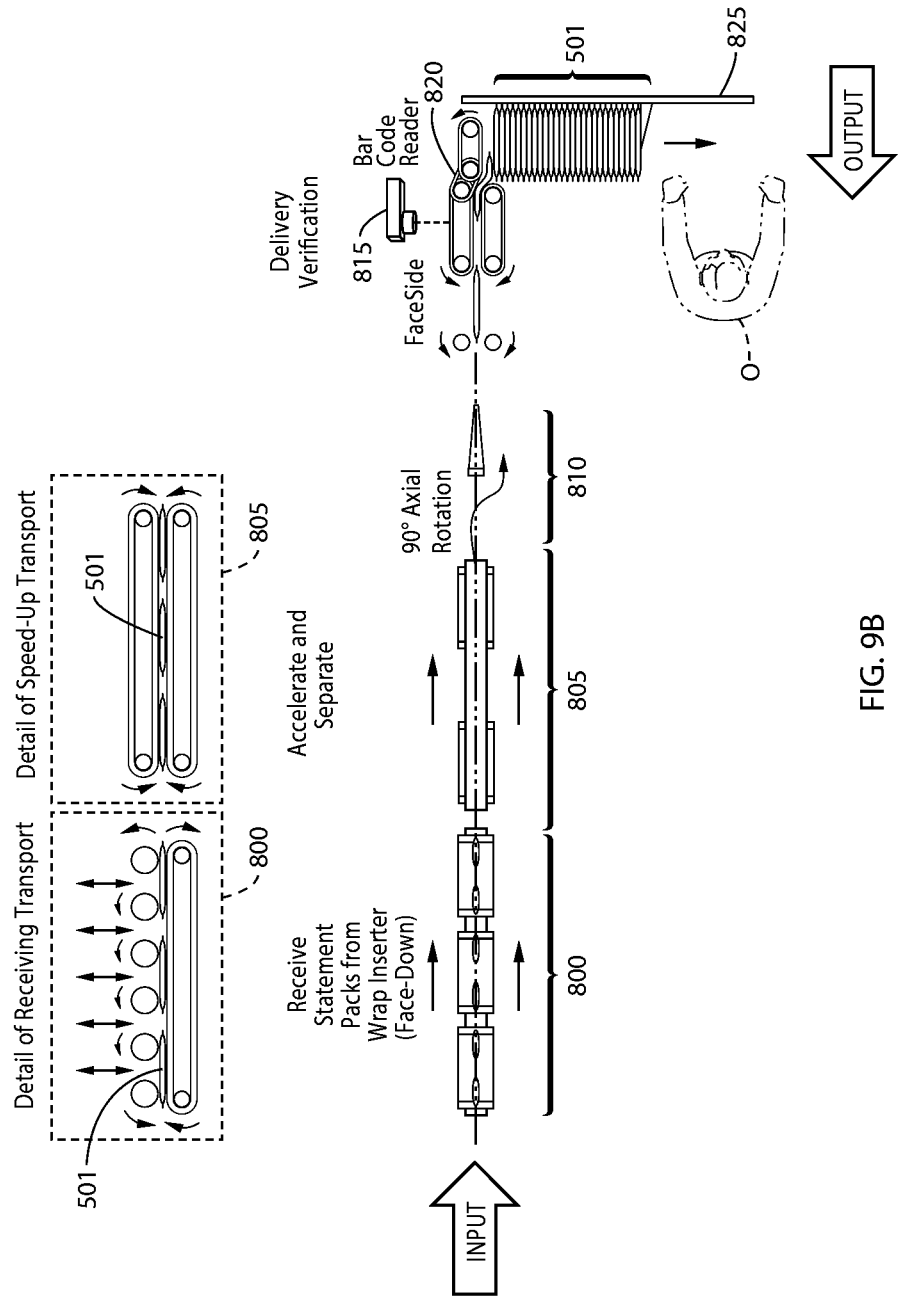
FIG. 9B shows an operational diagram of an outstacker used with the subject invention.

The outstacker 45 and its controlling computer 46 are seen in FIG. 1 and in FIGS. 9A and 9B. FIG. 9A shows where the input mailable packages 501 come in from the containerizer/wrap inserter 30 at a receiving transport set of belts 800 and exit onto a final receiving deck 825.

FIG. 9B depicts an operational flow diagram of the subject outstacker 45. Mailable packages 501 enter the outstacker at the left in FIG. 9B and into a receiving transport set of belts 800. The transport speed of the received mailable packages 501 is then increased 805 and each mailable package is rotated 90 degrees 810 so that the face of each mailable package 501 may have its identifying indicia read by a bar code reader 815 (or equivalent device) to once again check for errors. Transport belts 820 move the mailable packages 501 to a final receiving deck 825. The mailable packages 501 are then forwarded by an operator O or automatically to subsequent equipment for mailing.

Computer Control System

FIG. 10A through FIG. 15B show the flow diagrams for the five computers that share primary responsibility for controlling the mechanical components of the subject invention and interacting with the operator(s) O to maximize throughput and profitability of producing mailable packages that are mailed to recipient addresses, wherein each contains mailable package holds a plurality of identified mail pieces and desired inserts. It is noted that auxiliary computing devices handle routine tasks under command of the primary controllers, but those roles are only incidental to the subject invention.

Figure 10A:
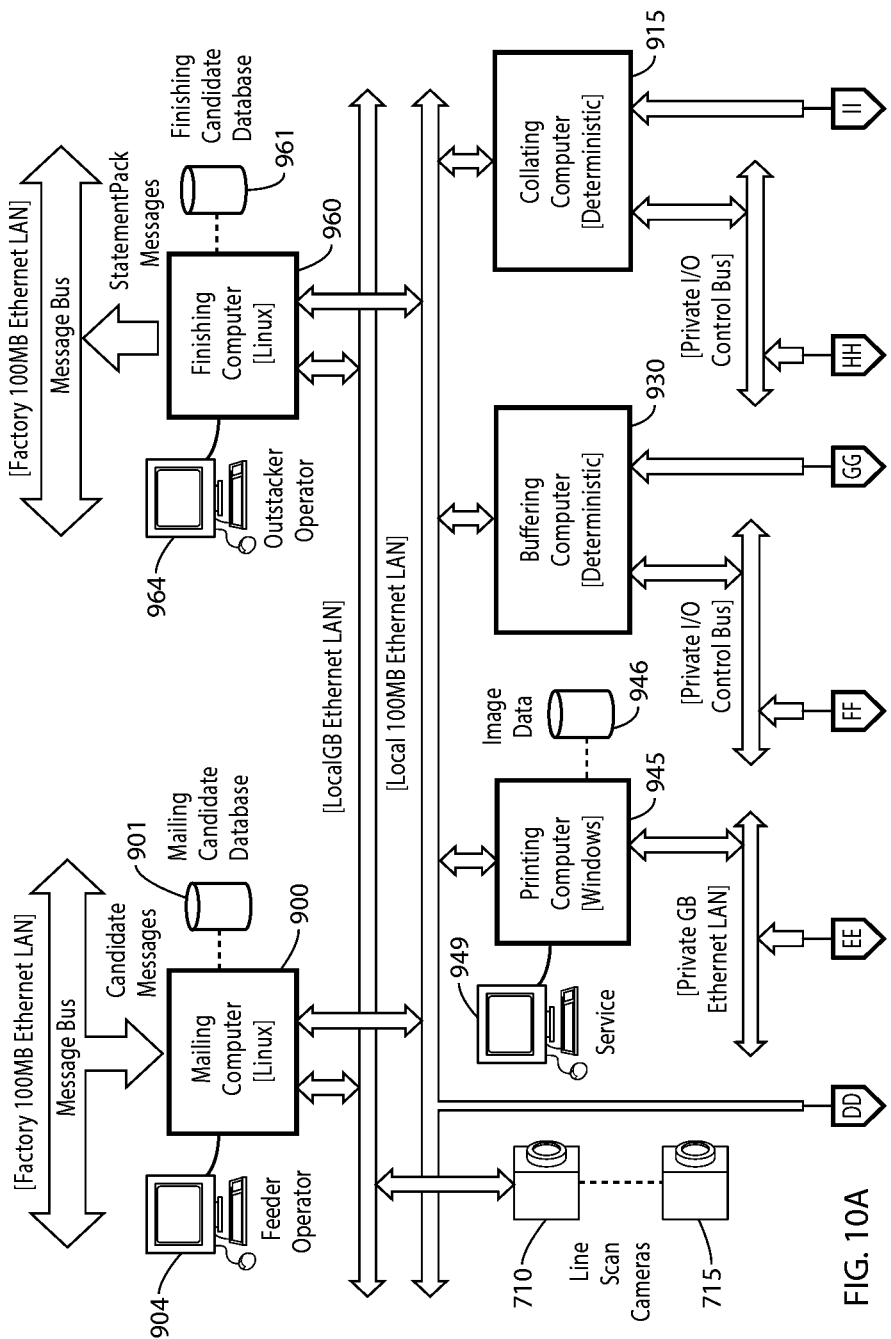
FIG. 10A shows upper half of the overall controller scheme flow diagram for the various programmed computers interfaced with and controlling the subject system.
Figure 10B:
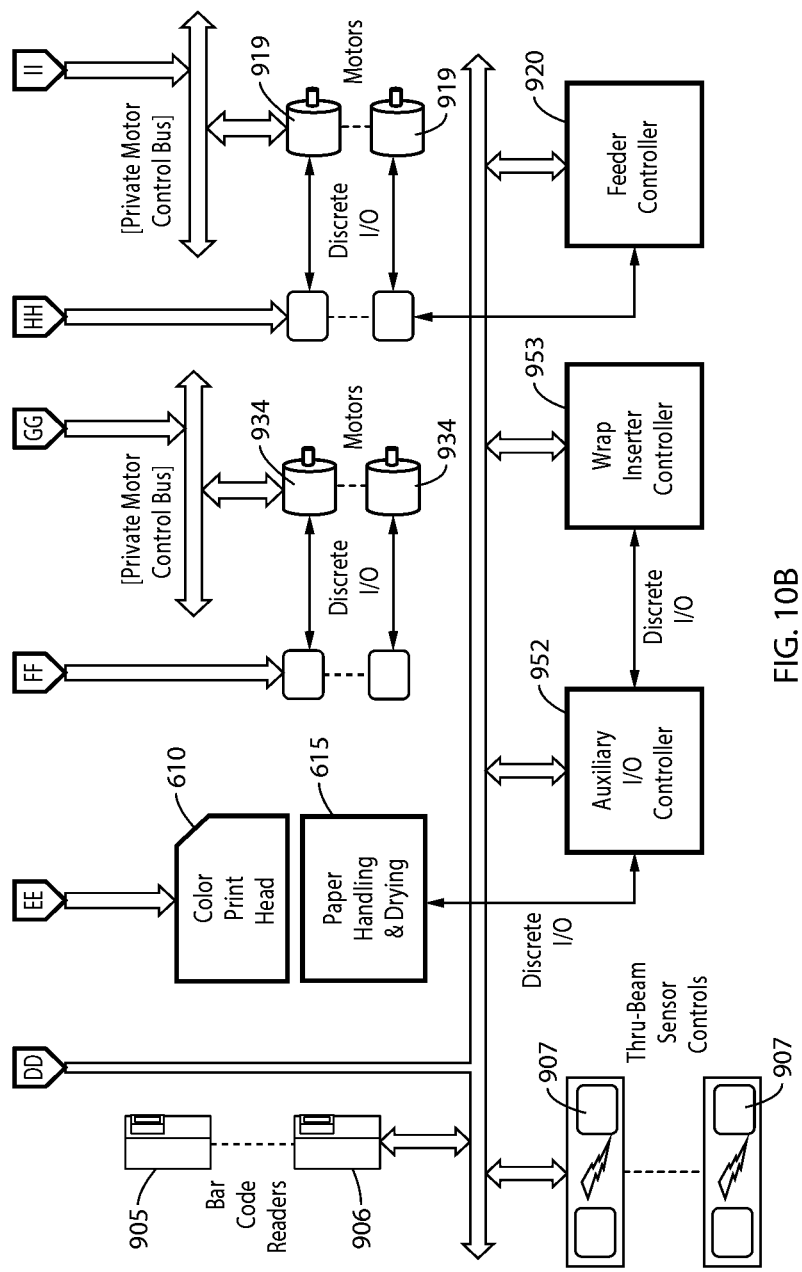
FIG. 10B shows the lower half of the overall controller scheme flow diagram for the various programmed computers interfaced with and controlling the subject system.
Figure 11A:
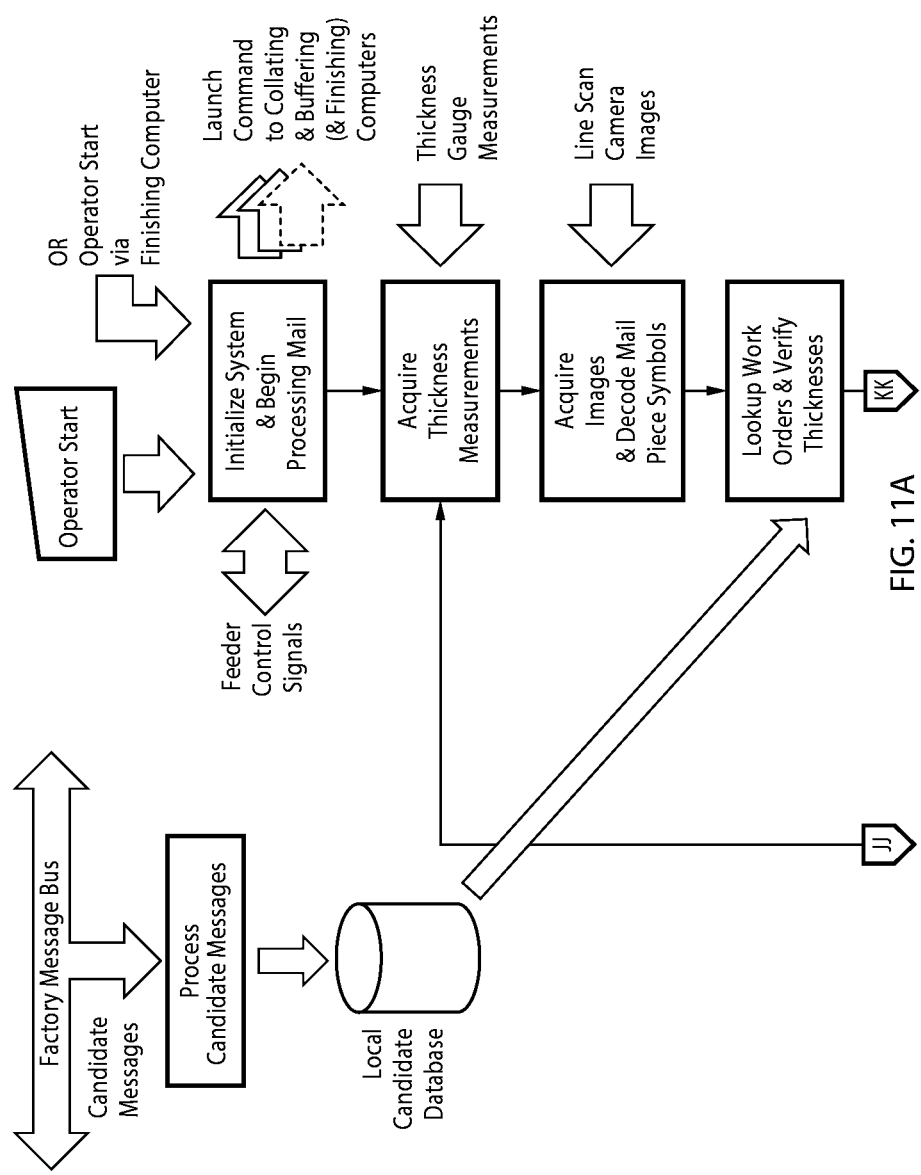
FIG. 11A shows the upper half of the controller scheme flow diagram for the system's mailing computer.
Figure 11B:
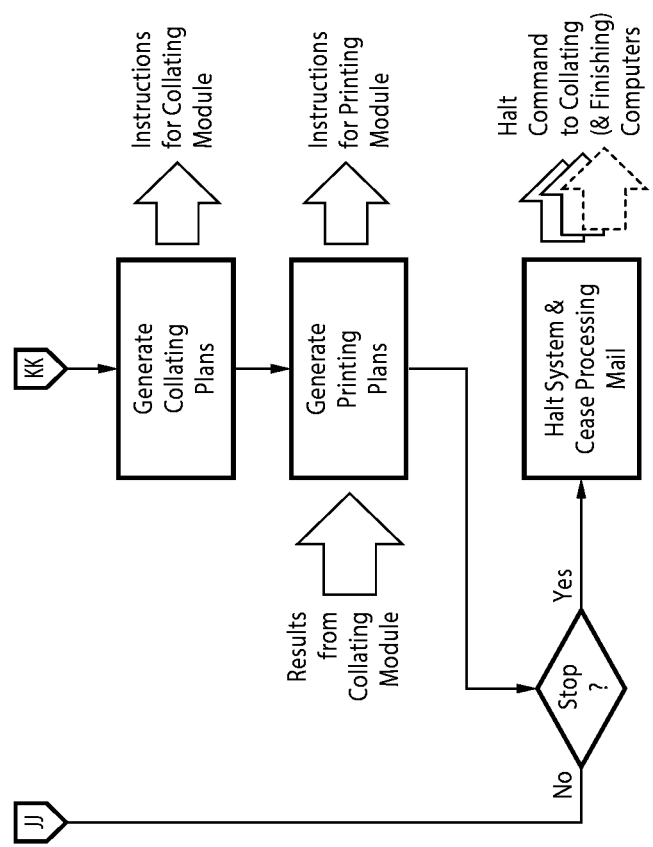
FIG. 11B shows the lower half of the controller scheme flow diagram for the system's mailing computer.
Figure 12A:
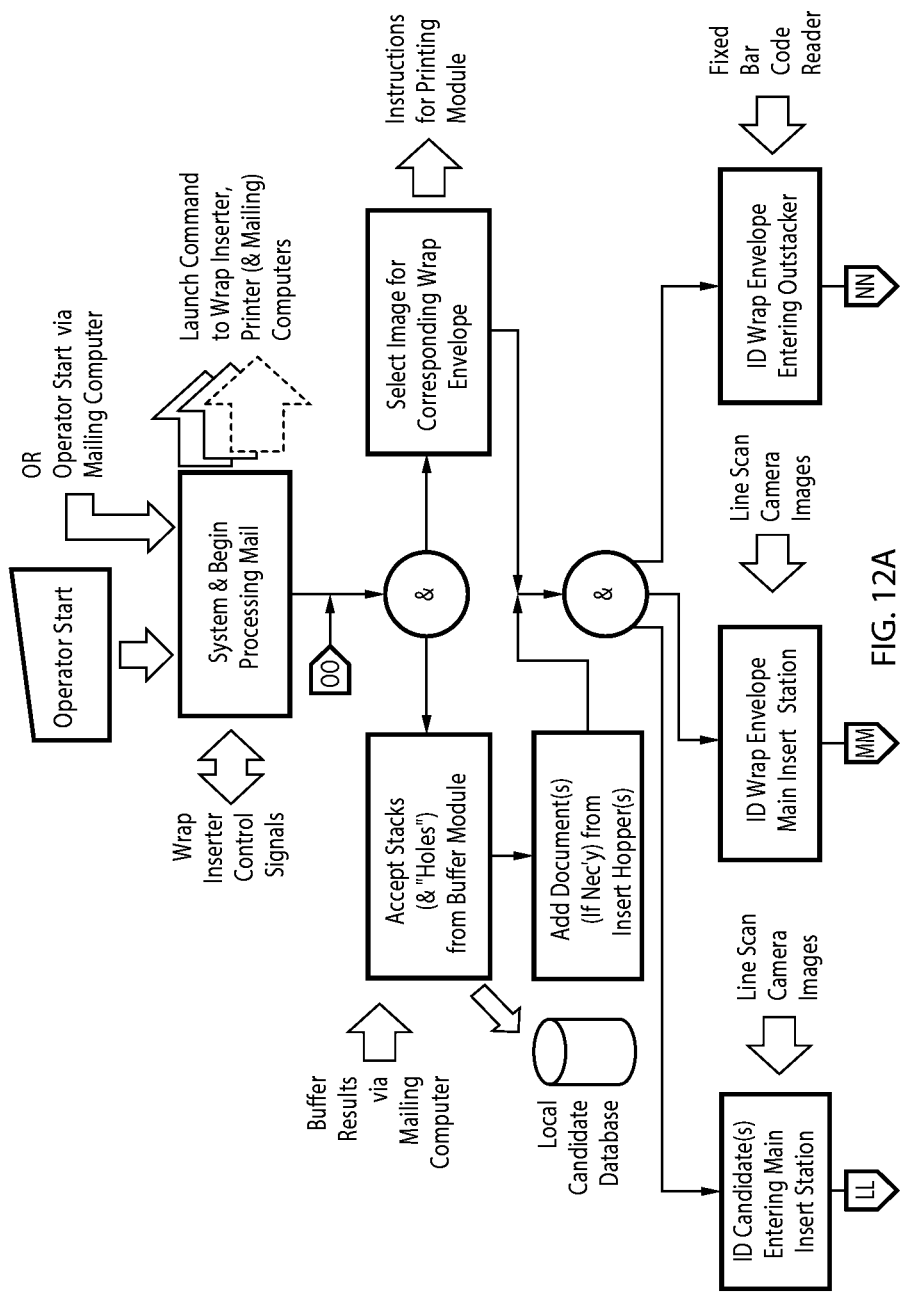
FIG. 12A shows the upper half of the controller scheme flow diagram for the system's finishing computer.
Figure 12B:
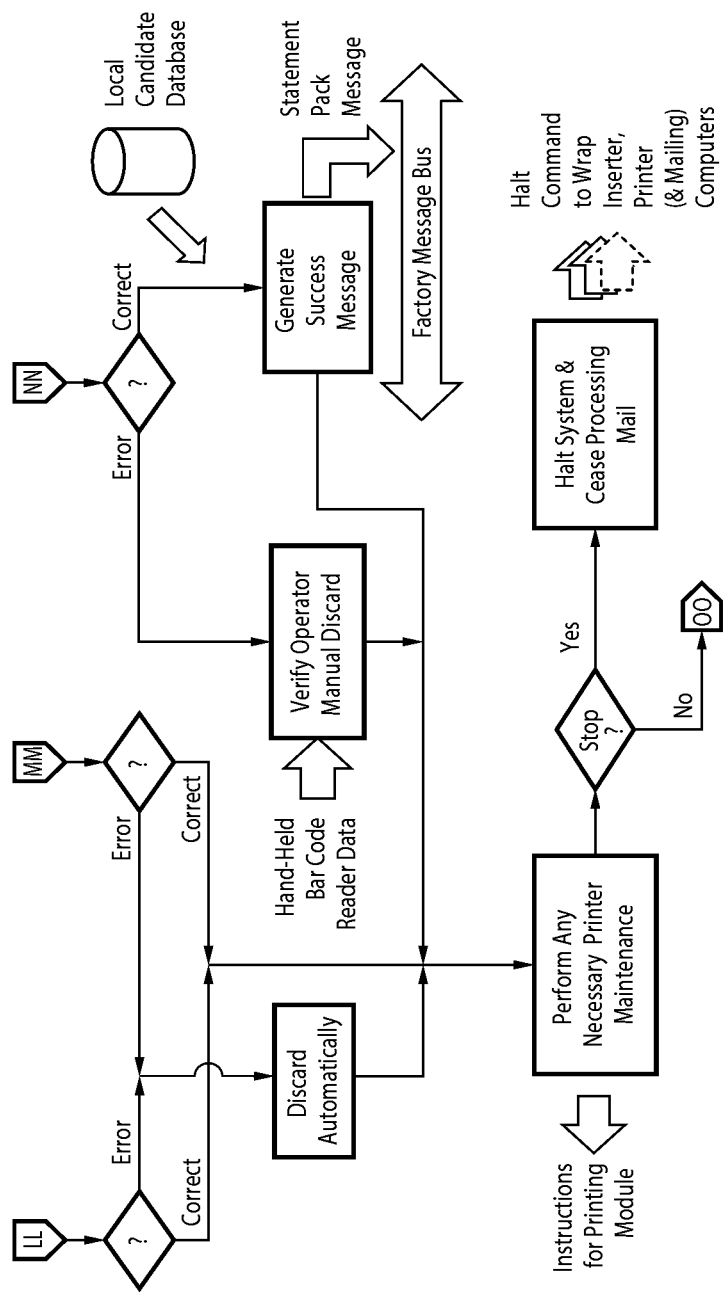
FIG. 12B shows the lower half of the controller scheme flow diagram for the system's finishing computer.
Figure 13A:
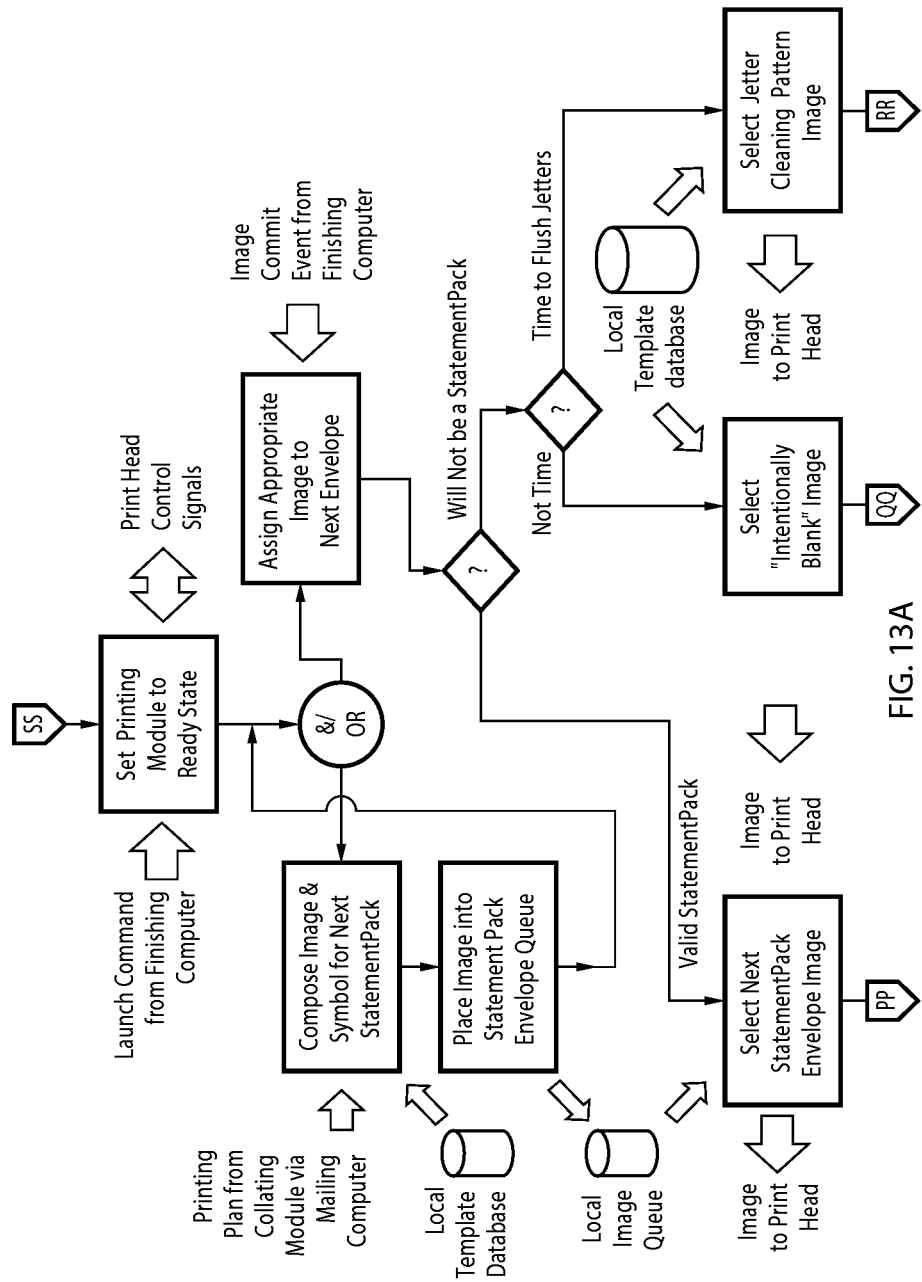
FIG. 13A shows the upper half of the controller scheme flow diagram for the system's printing computer.
Figure 13B:
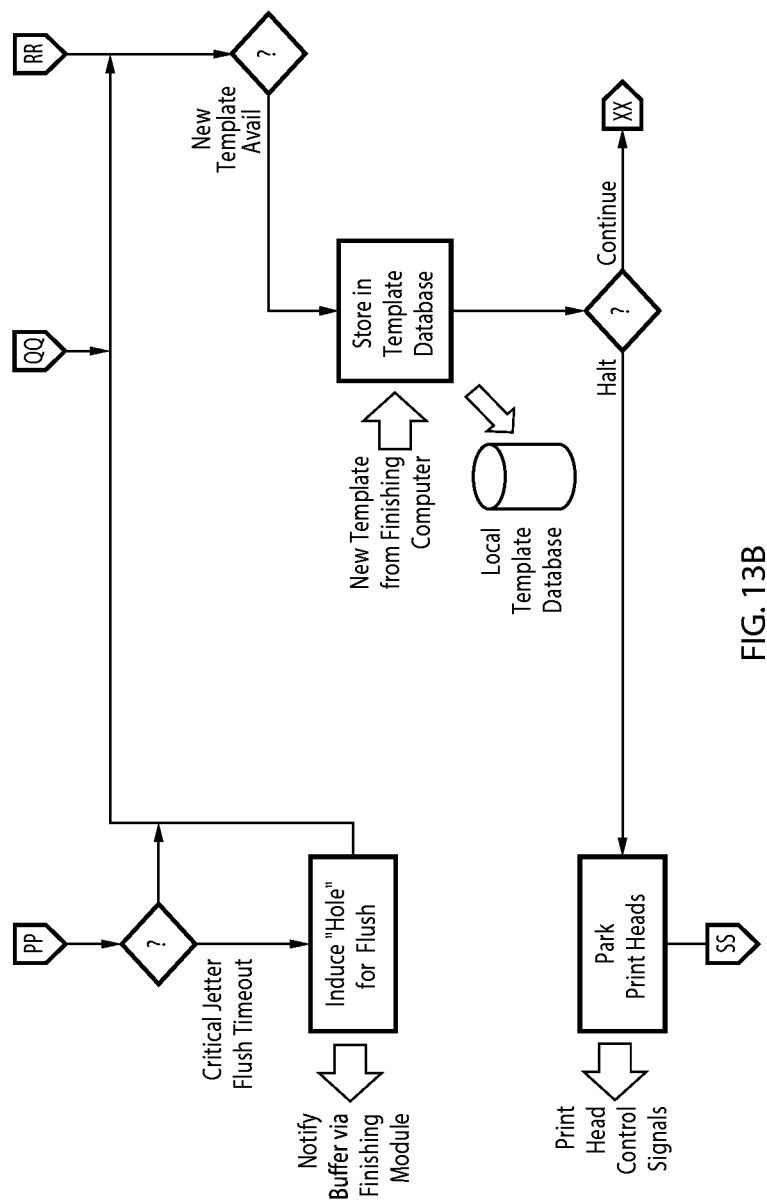
FIG. 13B shows the lower half of the controller scheme flow diagram for the system's printing computer.
Figure 14A:
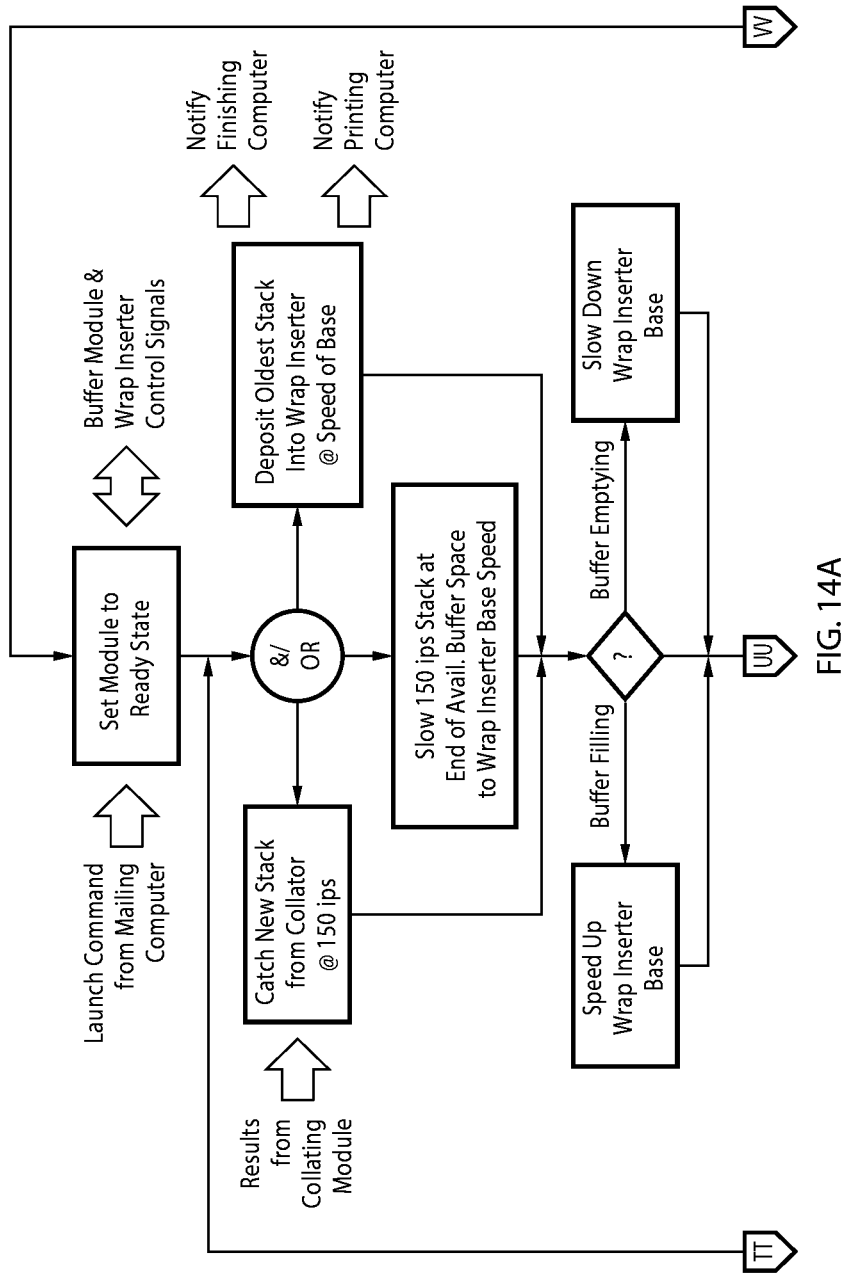
FIG. 14A shows the upper half of the controller scheme flow diagram for the system's buffering computer.
Figure 14B:
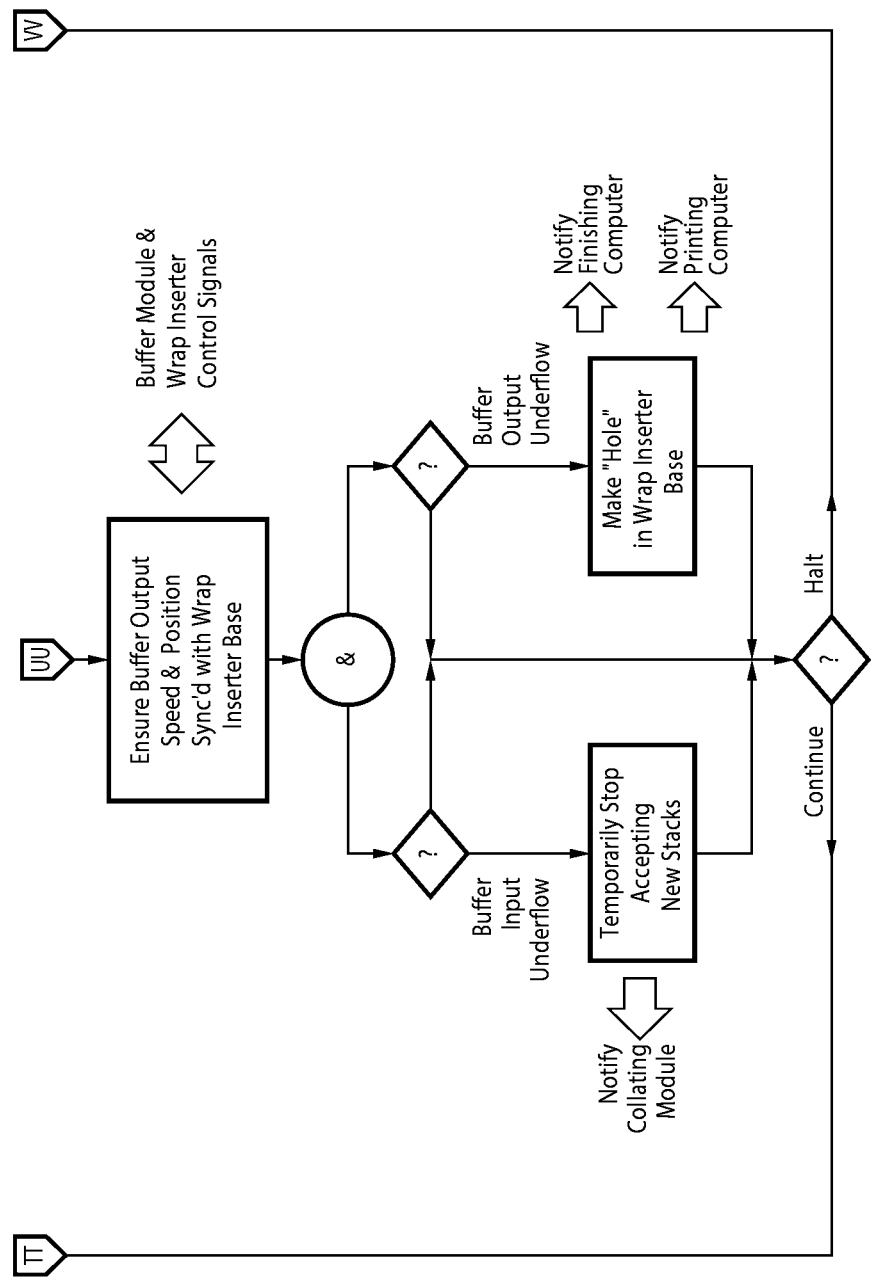
FIG. 14B shows the lower half of the controller scheme flow diagram for the system's buffering computer.
Figure 15A:
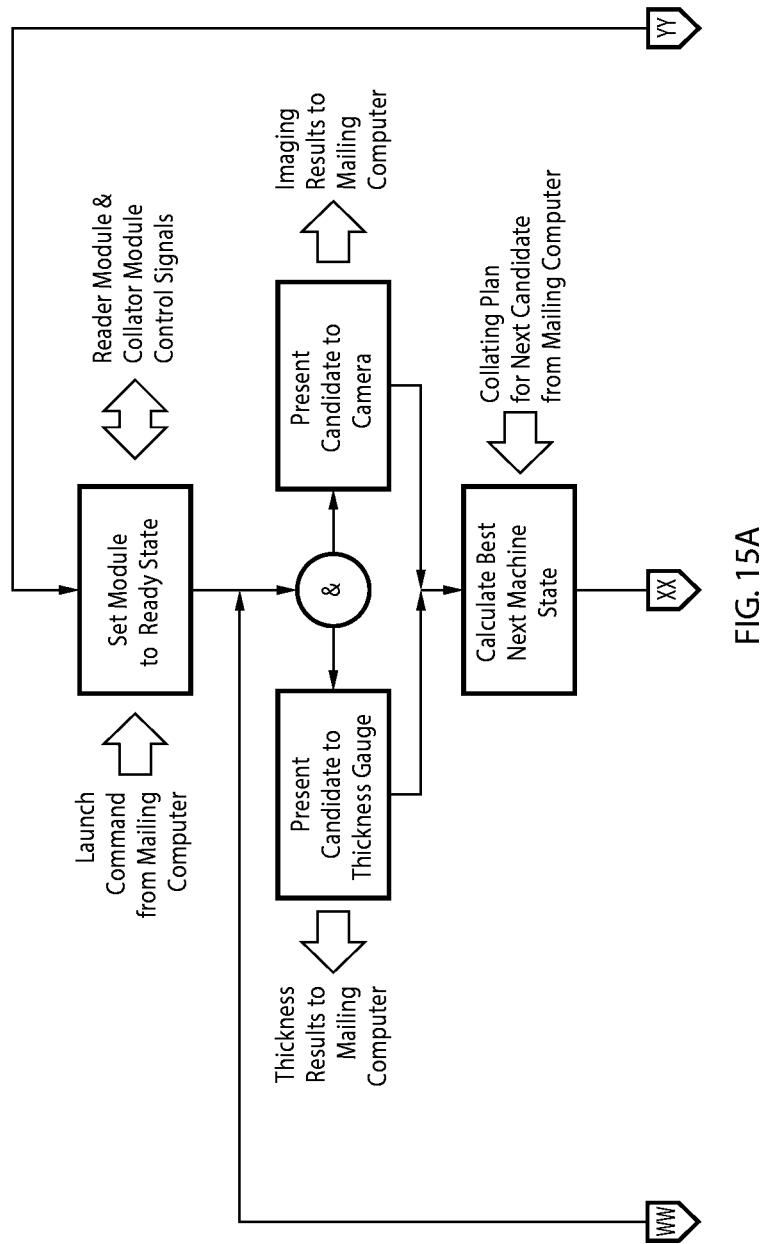
FIG. 15A shows the upper half of the controller scheme flow diagram for the system's collating computer.
Figure 15B:
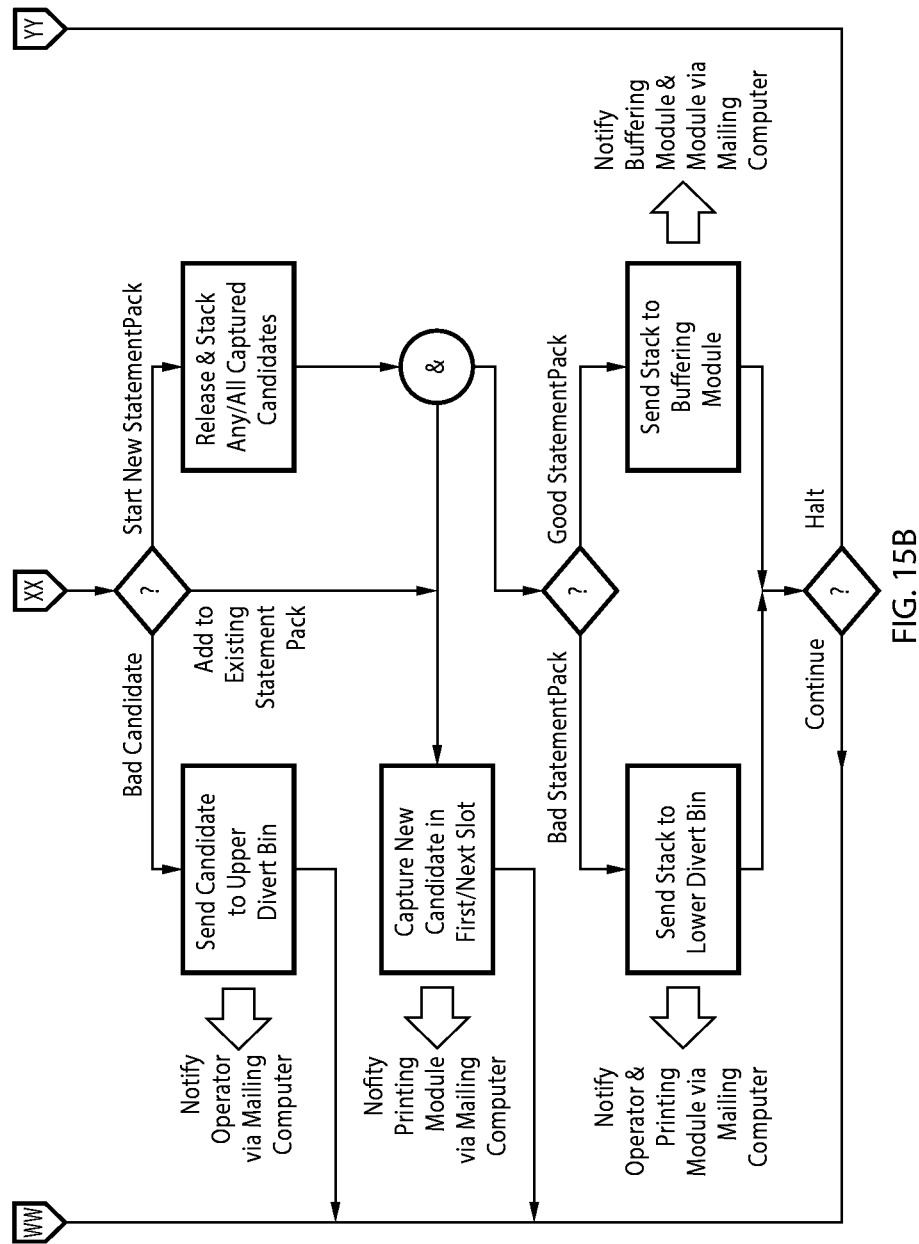
FIG. 15B shows the lower half of the controller scheme flow diagram for the system's collating computer.

The five computers are: 1) Mailing Computer 900; 2) Collating Computer 915; 3) Buffering Computer 930; 4) Printing Computer 945; and 5) Finishing Compute 960. The interacting and interfaced roles of each are depicted in FIGS. 10A and 10B. As shown, the five main computers 900, 915, 930, 945, and 960 are interconnected by standard means. As in indicated in FIGS. 10A and 10B various databases 901 946, and 961, line scan cameras 710 and 715, bar code readers 905 and 906, sensors 907, print head(s) 610, paper handler/dryer 615, and motors 919 and 934 are operated by the system-associated computers 900, 915, 930, 945, and 960 and auxiliary controllers 920, 952, and 953. Also, usually feeder, service, and outstacker operators O interact with the system via computer monitor stations 904, 949, and 964.

It is stressed that various standard controlling messages, operations, and interfacing procedures are noted on the computer flow diagrams shown in FIG. 10A through FIG. 15B which are not, for the sake of clarity, repeated in the following discussion. FIG. 10A through FIG. 15B outline the interconnective nature of the computers controlling the subject components and their operation.

The subject Mailing Computer 900 (seen in FIGS. 11A and 11B in detail) monitors the factory's message bus, which is part of the IT infrastructure of the facility and external to the machine. When the upstream culling process (described above) commits candidate mail pieces to be sent for StatementPack™ processing, a message is generated announcing that fact and providing necessary processing information. The messages are typically generated several hours before the corresponding mail pieces physically arrive at a machine for processing. The information is stored locally in the Mailing Computer's candidate database 901 until it is needed. When it is no longer needed it is discarded. All StatementPack™ systems in a single facility acquire all candidate information so that candidates can be processed on any machine.

The Mailing Computer 900 interacts with the feeder operator O to commence processing. Its commands initiate the flow of mail pieces through the subject system. A mechanical gauge measures each mail piece's thickness and sends it (via the Collating Computer 915) to the Mailing Computer 900, and a camera 905 photographs each mail piece's face and sends the image to the Mailing Computer 900, where software decodes the Intelligent Mail Barcode printed on each mail piece (or visible through each mail piece's envelope window, if this alternate method is utilized), then looks up the corresponding information in the Candidate Database 901. This information is used, in combination with that of neighboring mail pieces and various business rules, to generate Collating Plans for the Collating Computer 915 and Printing Plans for the Printing Computer 945. The Mailing Computer 900 is powerful enough to carry out these tasks and transmit plans in time for the collating module 20 and printing module 40 to ready them before the corresponding material arrives.

The Collating Computer 915 (seen in FIGS. 15A and 15B in detail) activates the conveyor belts, divert gates, and buffer 25 components as necessary to execute the Mailing Computer's 900 Collating Plans as the corresponding mail pieces flow through the collator 20 module. Optical sensors spread throughout the module enable the Collating Computer 915 to track each mail piece's progress and accurately synchronize mechanical actions with each mail piece's position, as well as quickly detect exception events such as jams. The Collating Computer 915 is powerful enough to be able to make decisions approximately every $\frac{1}{16}^{th}$ inch of mail piece travel. The results of collation activity are presented to the Buffering Computer 930 in time for the buffer module 25 to ready itself before the corresponding mail pieces arrive.

The Buffering Computer 930 (seen in FIGS. 14A and 14B in detail) activates the conveyor components of the buffer module 25 and directs the speed of the wrap inserter module 30 to synchronize the flow of collated packs of identified mail pieces 401 into the wrap inserter track/base 705. Optical sensors spread throughout the module enable the Buffering Computer to track each mail piece's progress and accurately synchronize mechanical actions with each mail piece's position, as well as quickly detect exception events such as jams. The Buffering Computer 930 closely monitors the speed and position of the wrap inserter track/base 705. The Buffering Computer 930 is powerful enough to be able to make decisions approximately every $\frac{1}{16}^{th}$ inch of mail piece and wrap inserter track/base 705 travel. The results of buffering activity are presented to the Finishing Computer 960 in time for the wrap inserter module 30 to ready itself before the corresponding mail pieces arrive.

The Printing Computer 945 (seen in FIGS. 13A and 13B in detail) composes images in accordance with the Printing Plans delivered by the Mailing Computer 900 and the technical specifications of the printing module 40. It also oversees routine maintenance of the print head 610, activating as necessary its jetter module cleaning and protection systems and ensuring that the operator O is hailed when necessary for services such as ink refills. The Printing Computer 945 is powerful enough to supply compliant images to the print head 610 before the corresponding wrap envelope material arrives at the printing station 40, and to keep up with the machine when it is operating at top speed. The Printing Computer 945 also ensures that each wrap/envelope's printed image includes a machine readable indicium/symbol uniquely identifying it. The results of printing activity are presented to the Finishing Computer 960 in time for the wrap inserter module 30 to ready itself before the corresponding envelopes arrive.

The Finishing Computer 960 (seen in FIGS. 12A and 12B in detail) oversees the flow of packs 401 coming down the wrap inserter track/base 705 from the buffer module 25, the flow of wrap envelope material coming from the printing module 40, the coming together of the two material streams, and the flow of resulting material, both successfully assembled StatementPacks™ and otherwise, into divert bins and onto the outstacker module 45. Part of the task of overseeing the flow of packs 401 coming down the wrap inserter track/base 705 includes placing desired inserts on top of the packs 401, thereby generating packs with desired inserts 500, by activating the insert hoppers 720 along the upstream half of the module. Just before the packs with desired inserts 500 are wrapped inside the addressed wrap/envelope material, a camera 710 photographs the face of the identified mail piece on the bottom of the pack 500 and presents the image to the Finishing Computer 960, where the mail piece's Intelligent Mail Barcode is once again decoded. This is compared to the symbol placed on the corresponding wrap/envelope by the Printing Computer 945 to ensure a proper match. The Finishing Computer 960 interacts with the outstacker operator O, a handheld bar code reader 905, and a final automated bar code reader 906 integrated into the outstacker module 45 to ensure that every StatementPack™ is accurately accounted for, both successfully assembled packs and otherwise. Once results are final the Finishing Computer 960 transmits such information via the factory's message bus so that the appropriate monitoring systems and downstream processing components are ready to meet their obligations.

Embodiments of the present invention may be described with reference to equations, algorithms, and/or flowchart illustrations of methods according to embodiments of the invention. These methods may be implemented using computer program instructions executable on a computer. These methods may also be implemented as computer program products either separately, or as a component of an apparatus or system. In this regard, each equation, algorithm, or block or step of a flowchart, and combinations thereof, may be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the equation(s), algorithm(s), and/or flowchart(s).

Accordingly, the equations, algorithms, and/or flowcharts support combinations of means for performing the specified functions, combinations of steps for performing the specified functions, and computer program instructions, such as embodied in computer-readable program code logic means, for performing the specified functions. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the equation(s), algorithm(s), and/or block(s) of the flowchart(s).

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method for assembling and containerizing to-be-mailed mail pieces, before being given to an origin USPS facility for transporting the to-be-mailed mail pieces to at least one destination USPS facility, being mailed to a same recipient address within the single postal compliant mailing pack; comprising:
   a. culling and sorting candidate to-be-mailed mail pieces from a pool of general mail pieces to generate candidate to-be-mailed mail pieces that are ordered and destined for a single desired mail pack, wherein said ordered candidate to-be-mailed mail pieces are ordered by being adjacent to each other, so that no other candidate to-be-mailed mail pieces for a different mail pack are in between the individual ordered candidate to-be-mailed mail pieces destined for the single desired mail pack;
   b. feeding singulated said candidate to-be-mailed mail pieces into an indicia reader;
   c. reading indicia on said candidate to-be-mailed mail pieces, wherein said reading coupled with applying weight and thickness tests produces identified mail pieces with associated postage costs and said identified mail pieces are transferred to a collator;
   d. collating in a continuous mail piece motion process with a plurality of collating modules and a collating computer a plurality of identified mail pieces into weight and thickness compliant mailing packs, wherein each said mailing pack contains said identified mail pieces going to the same recipient address, wherein said collating maximizes profitability by utilizing postal discounts for mailing in a single postal compliant mailing pack a plurality of mail pieces to the same recipient address, wherein each said collating module comprises:
      i. upper input conveyor belts for receiving incoming said identified mail pieces;
      ii. a diverter for directing, upon instructions from said collating computer, identified mail pieces away from said upper conveyor belts to pinch rollers in a buffering region;
      iii. said pinch rollers for stopping said collating computer diverted desired identified mail pieces in said buffering region; and
      iv. lower output conveyor belts that receive said collating computer diverted identified mail pieces from said pinch rollers and transfer said identified mail pieces to a containerizing mechanism, wherein said collator computer causes said pinch rollers in said buffer region to eject stopped an identified mail piece at just the right time so that any identified mail piece in said lower conveyor belt from a previous collating module are stacked into said mailing packs and exit via said lower output conveyor belts to said containerizing mechanism;
   e. containerizing each said particular collated mailing pack into a particular single desired postal compliant addressed mailing container;
   f. affixing a postage to said particular single desired postal compliant addressed mailing container via a printed IMB code on said particular single desired postal compliant address mailing container; and
   g. controlling the overall method with at least one computer processor programmed to interface with the system for overseeing the operation of the system, in addition to said collator computer.

2. The method for assembling and containerizing mailing pieces according to claim 1, further comprising buffering a transfer speed of sequence-maintained collated packs of said identified mail pieces to an operational speed of a containerizer mechanism configured and employed to containerize said packs.

3. The method for assembling and containerizing mailing pieces according to claim 1, wherein said containerizing further comprises selecting one or more desired inserts for adding to each said pack of identified mail pieces for mailing to the same address.

4. The method for assembling and containerizing mail pieces according to claim 1, further comprising printing information on each said mailing container with a printer that utilizes a vacuum platen, wherein said vacuum platen creates a slight vacuum to stabilize the wrapper as it is being printed.

5. The method for assembling and containerizing mail pieces according to claim 1, further comprising outstacking each said mailing container to a selected location for further processing.

6. A method for assembling and containerizing to-be-mailed mail pieces, before being given to an origin USPS facility for transporting the to-be-mailed mail pieces to at least one destination USPS facility, being mailed to a same recipient address within said single postal compliant mailing pack; comprising:

a. culling and sorting candidate to-be-mailed mail pieces from a pool of general mail pieces to generate candidate to-be-mailed mail pieces that are ordered and destined for a single desired mail pack, wherein said ordered candidate to-be-mailed mail pieces are ordered by being adjacent to each other, so that no other candidate to-be-mailed mail pieces for a different mail pack are in between the individual ordered candidate to-be-mailed mail pieces destined for the single desired mail pack;
  b. delivering singulated said candidate to-be-mailed mail pieces from a feeder/singulator to an indicia reader;
  c. identifying indicia on each said candidate mail piece read by said indicia reader coupled to said feeder/singulator and verified by applying weight and thickness tests with associated postage costs, thereby producing identified to-be-mailed mail pieces;
  d. collating in a continuous mail piece motion process with a plurality of collating modules and a collating computer a plurality of said identified to-be-mailed mail pieces going to the same recipient address into a weight and thickness compliant mailing pack by a collator coupled to said reader, wherein said collating maximizes profitability by utilizing postal discounts for mailing in a single postal compliant mailing pack a plurality of mail pieces being mailed to a same recipient address within the single postal compliant mailing pack, wherein each said collating module comprises:
    i. upper input conveyor belts for receiving incoming said identified mail pieces;
    ii. a diverter for directing, upon instructions from said collating computer, identified mail pieces away from said upper conveyor belts to pinch rollers in a buffering region;
    iii. said pinch rollers for stopping said collating computer diverted desired identified mail pieces in said buffering region; and
    iv. lower output conveyor belts that receive said collating computer diverted identified mail pieces from said pinch rollers and transfer said identified mail pieces to a buffering mechanism, wherein said collator computer causes said pinch rollers in said buffer region to eject stopped an identified mail piece at just the right time so that any identified mail piece in said lower conveyor belt from a previous collating module are stacked into said mailing packs and exit via said lower output conveyor belts to said buffering mechanism;
  e. buffering a transfer speed of sequence-maintained collated weight and thickness compliant packs of said identified mail pieces between said collator and an operational speed of a wrap inserter;
  f. wrapping said collated weight and thickness compliant packs of said identified mail pieces into a particular single desired postal compliant addressed mailing container, wherein said wrap inserter comprises:
    i. a mechanism configured for packaging each said weight and thickness compliant mailing pack and desired inserts into an addressed mailing wrapper; and
    ii. a mechanism configured for selecting said desired inserts for inclusion with each said weight and thickness compliant mailing pack into each said addressed mailing wrapper producing the single postal compliant container with desired contents;
  g. printing each said addressed mailing wrapper by means of a vacuum platen containing printer coupled to said wrap inserter, wherein said vacuum platen creates a slight vacuum to stabilize the wrapper as it is being printed;
  h. transferring said postal compliant addressed mailing container and desired inserts by means of an outstacker to a selected location for further processing;
  i. affixing a postage to said particular single desired postal compliant addressed mailing container via a printed IMB code on said particular single desired postal compliant address mailing container;
  j. transporting said postage affixed postal compliant addressed mailing container to the USPS facility for mailing; and
  k. controlling the method by means of at least one computer processor programmed to interface with the system for overseeing the operation of the system, in addition to said collator computer.

7. The mail piece assembly and wrapping system according to claim 6, further comprising:
  i. a buffering computer;
  ii. a printing computer; and
  iii. a finishing computer.

* * * * *